(12) United States Patent
Harvey

(10) Patent No.: US 7,491,330 B2
(45) Date of Patent: *Feb. 17, 2009

(54) SILVER CHLORIDE TREATED WATER PURIFICATION DEVICE CONTAINING THE POROUS GROG AND METHOD FOR MAKING SAME

(76) Inventor: Anthony Reid Harvey, 109 Russell St., Buffalo, NY (US) 14214

( * ) Notice: Subject to any disclaimer, the term of this patent is extended or adjusted under 35 U.S.C. 154(b) by 0 days.

This patent is subject to a terminal disclaimer.

(21) Appl. No.: 10/969,930

(22) Filed: Oct. 22, 2004

(65) Prior Publication Data

US 2005/0124482 A1  Jun. 9, 2005

Related U.S. Application Data

(63) Continuation-in-part of application No. 10/112,936, filed on Apr. 2, 2002, now Pat. No. 6,905,598, which is a continuation-in-part of application No. 09/692,203, filed on Oct. 20, 2000, now Pat. No. 6,537,939.

(51) Int. Cl.
*B01D 24/00* (2006.01)
*B01D 39/00* (2006.01)

(52) U.S. Cl. ............... 210/510.1; 210/496; 210/500.21; 210/502.1; 210/503; 210/902; 210/908; 210/911; 501/80; 501/81

(58) Field of Classification Search .......... 210/510, 210/496, 502.1, 503, 902, 908, 911, 500.21, 210/510.1; 501/80, 81

See application file for complete search history.

(56) References Cited

U.S. PATENT DOCUMENTS

| | | | |
|---|---|---|---|
| 1,473,331 A * | 11/1923 | Bechhold | 210/501 |
| 1,557,235 A * | 10/1925 | Becthold | 210/501 |
| 1,988,246 A | 1/1935 | Krause | |
| 3,878,104 A | 4/1975 | Guerrero | |
| 3,886,244 A | 5/1975 | Bayer et al. | |
| 3,939,079 A | 2/1976 | Uchiyama et al. | |
| 4,054,515 A | 10/1977 | Sawyer, Jr. | |
| 4,116,826 A | 9/1978 | Sawyer, Jr. | |
| 4,116,827 A | 9/1978 | Sawyer, Jr. | |

(Continued)

FOREIGN PATENT DOCUMENTS

CN  1037465  11/1989

(Continued)

OTHER PUBLICATIONS

Chemical Abstract—in English for JP 10258228 (Sep. 1998) Igami. Japan Patent.*

(Continued)

*Primary Examiner*—Paul Marcantoni
(74) *Attorney, Agent, or Firm*—Goodwin Procter LLP

(57) ABSTRACT

A porous grog with a body composition of water, clay and combustible material. Further, an earthenware water purification filter utilizing the porous grog in the body composition of the filter. Further, an earthenware filter utilizing silver chloride treatment for water disinfection is disclosed. A water purification system incorporating said filter, said water purification system capable of removing about 99% of all particles not less than 1.0 micron is size, and removing virtually 100% of fecal coliform indicators. In other embodiments, methods of disinfecting pottery toilet liners including various open surfaces using silver chloride treatment are disclosed.

3 Claims, 18 Drawing Sheets

U.S. PATENT DOCUMENTS

| | | | |
|---|---|---|---|
| 4,438,055 A | | 3/1984 | Van der Velden |
| 4,780,433 A | | 10/1988 | Keller, Jr. |
| 4,900,698 A | | 2/1990 | Lundsager |
| 5,151,122 A | | 9/1992 | Atsumi et al. |
| 5,183,787 A | | 2/1993 | Seaborne |
| 5,229,013 A | | 7/1993 | Regutti |
| 5,543,056 A | | 8/1996 | Murcott et al. |
| 5,614,568 A | * | 3/1997 | Mawatari et al. ............ 523/122 |
| 5,618,762 A | | 4/1997 | Shirakawa et al. |
| 5,716,894 A | * | 2/1998 | Messer et al. ............... 501/141 |
| 5,824,220 A | | 10/1998 | Grangeon et al. |
| 6,042,763 A | | 3/2000 | Kumaoka |
| 6,420,292 B1 | | 7/2002 | Kumaoka |
| 6,537,939 B1 | * | 3/2003 | Harvey ........................ 501/81 |
| 6,602,410 B1 | | 8/2003 | Tanner et al. |
| 6,905,598 B2 | * | 6/2005 | Harvey .................... 210/510.1 |

FOREIGN PATENT DOCUMENTS

| | | | |
|---|---|---|---|
| CN | 1186712 | | 7/1998 |
| JP | 59013918 | * | 4/1984 |
| JP | 02071811 | | 3/1990 |
| JP | 03161408 | | 7/1991 |
| JP | 06305851 | | 11/1994 |
| JP | 10085590 | | 4/1998 |
| JP | 10258228 | * | 9/1998 |
| KR | 9501397 | | 2/1995 |

OTHER PUBLICATIONS

Outdoor Adventure Canada-Gear Reviews-Katadyn Water Filter (www.outdooradventurecanada.com), No date available, pp. 1-2.*

James Filter-Doulton water filter history, pp. 1-2, 2-2, 1-5, 2-5, 3-5, 4-5, and 5-5, and 1-3, 2-3, and 3-3. No date available. See www.jamesfilter.com.*

International Development Enterprises-Ceramic Water Purifier (pp. 1-2 and 2-2), no date available. See also www.ideorg.org.*

Definition of Grog from www.cat.cc.md.us (no date available).*

Definition of Grog (clay) from Wikipedia free encyclopedia (en.wikipedia.org)—no date available.*

Definition of Earthenware from Wikipedia free on-line encyclopedia—no date available.*

Blick Art Materials Catalog (Amaco No. 27 white sculpture raku clay) —www.dickblick.com no date available.*

Sustainable Village- Arsenic Drip Filter Water Purification www.sustainablevillage.com catalog on line order—no date available.*

Ecofilter Project-Components of the Ecofilter, www.waterfiltersforthepoor.com (no date available).*

Ecofilter Project-Creation process of the Ecofilter, www.waterfiltersforthepoor.com (no date available) 2 pages.*

Ecofilter Project-THe finished product, www.waterfiltersforthepoor.com (no date available).*

"The influence of pH and coarse media on manganese preciipitation from water" Aziz et al. (1992), Water Research, 26(6), 853—5.*

"Study on the removal of arsenic contents in underground water using ferric sulfate cogaulation method", Inst Min Met Mater Sci Natl Cheung King Univ. Tainan, Taiwan. (Kuangye (Taipei Taiwan) 1978-22(3), 81-93.*

Introduction to Ceramics, Kingery et al. (1960), p. 507-508.*

Answer 1 of 1 of Chemical Abstracts on STN CS 275259 (Feb. 19, 1992) Kucera et al. abstract only.*

Potters for Peace Webpage "Filters". Copyright 2006. See pp. 1-7.*

Harvey, A. Reid et al., A Permeable Grog For A Low Cost Water Purifier, http://phys4.harvard.edu/~wilson/remediation/ACER.html, Sep. 24, 2003, pp. 1-6.

Lantagne, Daniele et al., Point-of-Use Water Filtration in Rural Haiti, Submission for the dyd01 Proceedings, MIT Environmental Engineering, pp. 1-11, (no date available).

Lantagne, Daniele S., Investigation of the Potters for Peace Collodial Silver Impregnated Ceramic Filter, Report 2: Field Investigations, pp. 1-121, Jubilee House, (no date available).

Alethia Environmental, Water Quality Analysis In the Developing and Developed Worlds, Executive Summary, Investigation of the Potters for Peace Colloidal Silver Impregnated Ceramic Filter, Report 2: Field Investigations, pp. 1-2, (no date available).

MIT Video, "The Nepal Water Project", 2 pages, printed offline Feb. 14, 2002, (http://caes.mit.edu/mvp/html/nepal.html).

Department of Civil & Environmental Engineering, "Thesis Abstracts" Environmental Fluid Mechanics and Coastal Engineering, 64 pages, printed offline Feb. 14, 2002 (http://web.mit.edu/civenv/html/research/abstracts/coast.html).

"A-7 Three Kalshi", 3 pages, printed offline Feb. 14, 2002, MIT (Author Unknown) (http://web.mit.edu/shaheer/www/arsenic/templates/A7Kalshi.htm).

"A1-AquaBind.TM. Arsenic XP using Activated Alumina Metal Oxide", 3 pages, Author Unknown (http://web.mit.edu/shaheer/www/arsenic/templates/AlApyron..htm) (No Date Available).

Krause, G.A., "Oligodynamic Water Purification by Means of Catalytic Silver", Gesundheits-Ingenieur, vol. 52, pp. 500-505, 1929.

* cited by examiner 0.06 mm

SILVER CHLORIDE TREATED WATER PURIFICATION DEVICE CONTAINING THE POROUS GROG AND METHOD FOR MAKING SAME

CROSS REFERENCE TO RELATED APPLICATIONS

This application is a continuation-in-part of our U.S. application Ser. No. 10/112,936 filed Apr. 2, 2002 now U.S. Pat. No. 6,905,598, which is in turn a continuation-in-part of U.S. application Ser. No. 09/692,203, filed Oct. 20, 2000, now issued as U.S. Pat. No. 6,537,939. The teachings of these references are hereby incorporated by reference herein in their entirety.

BACKGROUND OF THE INVENTION (i) Field of the Invention

The present invention relates to a novel porous grog composition. Further, the present invention relates to a water purification filter and water purification device employing the novel porous grog composition. Additionally, the present invention relates to a method of making the novel porous grog composition and a method for employing the same in a water purification filter and water purification device.

(ii) Discussion of Related Art

Due to worldwide growth in population and industrialization, along with natural disasters, world supplies of safe drinking water are dwindling. Key pollutants that pose a threat to humans via polluted water consumption are pathogens (bacteria and viruses) and organics. Additionally, water resources may contain suspended material, dissolved solids, bacteriological contaminants, and biological contaminants. Conventional water filters are commonly used in American households to remove water impurities and provide cleaner, more aesthetically pleasing drinking water.

However, there are many disadvantages that make these filters difficult to use, especially in developing countries. Typically, such filters are expensive, bulky, difficult to install and replace, and cumbersome to use. Further, most filters available in the United States are not designed to remove pathogens because it is assumed that the water is pathogen free. With regard to available earthenware, most earthenware products are not porous enough to be adequately permeable to water or, if they are permeable, the water flow rate through them is too small to make them practical as water filters.

A number of ceramic water filters are known in the art. These filters typically are composed of clay and sawdust (which is thought by some to turn into charcoal when fired). For example, in the early 1980s, Fernando Mazareigos developed a porous clay filter for the Central American Research Institute for Industry (ICAITI). Since its development, this filter has been introduced and promoted in Central and South America. The body composition of Mazareigos' filter is 50% dry clay and 50% dry sawdust, by volume, of between 35 mesh and 60 mesh.

The ceramic water filters known in the art do not make use of porous grog. As such, they have a disadvantage of having a lower permeability. A further disadvantage of filters known in the art is that, in order to achieve an appropriate flow rate, their lower permeability requires that their size be larger. Larger filters have a disadvantage of being more susceptible to breakage which makes shipping from an efficient central production facility difficult and often requires that such filters be created at the site of intended use.

As such, there exists a need for a method of filtration which is inexpensive, relatively simple to manufacture, utilizes readily available components and, yet, still provides adequate water filtration. There also exists among earthenware products a distinct need for a composition which can provide the earthenware with an increased permeability and thereby allow smaller, less breakable filters with appropriate flow rates.

SUMMARY OF THE INVENTION

The present invention addresses the difficulties and problems discussed supra by providing for a composition of, and method for making, a porous grog (i.e., a very porous, pre-fired clay material). The porous grog of the present invention may be used to increase the permeability of earthenware. According to the present invention, the porous grog has a body composition of water, clay and combustible material. The clay may be selected from any fine-grained, firm earth material that is plastic when wet and hardens when heated. The combustible material is selected from any material which burns off during firing to create voids in the fired clay.

The resultant pressed body is then fired until the body matures into earthenware or until the pressed body can no longer be readily broken down by water. The earthenware is then crushed to yield granules of porous grog. The voids created during the burning off of the combustible material provide the porous grog with its unique permeability.

The present invention also addresses the difficulties and problems discussed supra by providing for a water purification filter employing the porous grog and a method for making same. The water purification filter is inexpensive and relatively simple to produce. Additionally, the water purification filter utilizes material components which are commonly and widely available. Further, it has been found through testing that the water purification filter of the present invention is capable of removing about 99% of particles of all sizes down to 1.0 micron, and of removing virtually 100% of fecal coliform indicators.

In other aspects of the present invention, the water purification filter has a body composition of water, clay, porous grog and combustible material. The body is allowed to dry to a relatively low moisture content before it is pressed within a set of dies, which resemble a mold. The resultant pressed body is then fired until the body matures into earthenware or until the pressed body can no longer be readily broken down by water. Following firing, silver may be applied to the water purification filter. The present invention further provides for a water purification system employing the water purification filter.

In further aspects of this invention, the treatment of silver chloride to disinfect and sanitize porous grog purifier and various applications to open surfaces are disclosed. In accordance with one exemplary embodiment, a method producing silver chloride deposited porous grog purifier is disclosed which comprises saturating said fired earthenware filter with silver nitrate; drying said earthenware filter; inserting said earthenware filter in a two-tiered purifier system; and flushing with salt water solution leading to the deposition of silver chloride onto said earthenware filter.

In accordance with other aspects of the present invention a device for purifying contaminated water is disclosed, said device comprising:

a top layer comprising porous grog, crushed brick or a mixture thereof having particle sizes from about 10 or 20 mesh;

a first intermediate layer comprising porous grog, crushed brick or a mixture thereof having particle sizes from about 60 mesh to about 100 mesh; a second intermediate layer comprising porous grog, crushed brick particles or a mixture thereof having particle sizes from about 60 mesh to about 100 mesh with a further, single digit percentage addition of sub 100 mesh grog for adjusting flow rate downward; wherein said layers comprises silver chloride; and wherein said contaminated water passing in order through said top layer, said first intermediate layer and said second intermediate layer.

In accordance with other aspects of the present invention, a method of producing low cost silver chloride treated particulate red-brick particulate grog purifier is disclosed, which comprises crushing red-brick to about 30 mesh; saturating said crushed red-brick grog with silver nitrate salt; drying said silver nitrate saturated crushed red brick grog; filling said saturated crushed red brick silver nitrate saturated grog into a container; and running salt water through said silver nitrate saturated grog; wherein silver chloride is deposited on the grog.

In accordance with further aspects of this invention, a device for purifying contaminated water, said device comprising:

top and bottom backflush layers comprising porous grog or crushed brick particles or mixture thereof having particle sizes of 10 to 20 mesh; a central purifying bed layer comprising porous grog having particle sizes 30 to 100 mesh; with a further, single digit percentage addition of sub 100 mesh grog for adjusting flow rate downward; wherein said backflush layers and intermediate layer further comprises silver chloride; and wherein said contaminated water passing in order through said top backflush layer, said intermediate layer and said bottom backflush layer.

In accordance with further aspect of this invention a device for purifying water is disclosed, said device comprising: a container; a purifier disk at the bottom of said container, said purifier disk having a body comprising clay, combustible material and porous grog, said porous grog is prepared by firing a mixture comprising clay and combustible material and subsequently crushing the resultant fired mixture; wherein nonpurified water enters the container and is purified by passing through said purifier disk; wherein said purifier disk further includes a treatment with silver chloride.

In accordance with further aspects of this invention, a sanitary pottery toilet liner device, said device comprising a continuous, flat circular earthenware comprising pottery clay material centrally joined to another cylindrical earthenware tube with open ends comprising pottery clay material; wherein the resulting one-piece earthenware device has a central circular aperture In accordance with other aspects of the invention, a method of disinfecting pottery toilet is disclosed which comprises firing the pottery toilet liner to 600° C. or higher temperatures; saturating said pottery toilet liner with silver nitrate; drying said pottery toilet liner; saturating said dried pottery liner with sodium chloride; and flushing with water; wherein silver chloride is deposited on the pottery toilet liner.

In accordance with further aspects of this exemplary embodiment, the pottery toilet may be formed so as to resemble conventional porcelain toilets.

In accordance with further aspects of this exemplary embodiment the toilets resembling the form of the conventional porcelain ones comprises sit down toilet or squat toilet.

In accordance with other aspects of this embodiment a method of disinfecting open surfaces comprising the treatment of silver chloride is disclosed.

In accordance with other aspects of this exemplary embodiment the open surface further comprises brick and tile surfaces.

In accordance with other aspects of this exemplary embodiment, the open surface further comprises porous surfaces.

In accordance with other aspects of this exemplary embodiment, the porous surfaces further comprises concrete or wood surfaces.

In accordance with other aspects of this exemplary embodiment, the open surfaces further comprises food preparation surfaces.

In accordance with other aspects of this exemplary embodiment, the open surfaces further comprises concrete surfaces.

In accordance with other aspects of this embodiment the open surfaces are internal surfaces of pottery containers made by village potters, fired to about 600° C., as well as pottery and ceramics fired at higher temperatures.

In accordance with other aspects of this embodiment a method of disinfecting grog/cement mortars using silver chloride treatment is provided.

In accordance with other aspects of this embodiment, a method of disinfecting grouts using silver chloride treatment is provided.

In accordance with other aspects of this embodiment, a method of disinfecting sanitary pottery toilet with the application of silver chloride is also provided.

The present disclosure will now be described in more detail with reference to exemplary embodiments thereof as shown in the accompanying drawings. While the present disclosure is described below with reference to exemplary embodiments, it should be understood that the present disclosure is not limited thereto. Those of ordinary skill in the art having access to the teachings herein will recognize additional implementations, modifications, and embodiments, as well as other fields of use, which are within the scope of the present disclosure as described herein, and with respect to which the present disclosure may be of significant utility.

BRIEF DESCRIPTION OF THE DRAWINGS

In order to facilitate a fuller understanding of the present disclosure, reference is now made to the accompanying drawings, in which like elements are referenced with like numerals. These drawings should not be construed as limiting the present disclosure, but are intended to be exemplary only.

DETAILED DESCRIPTION OF THE INVENTION

Figure 1:
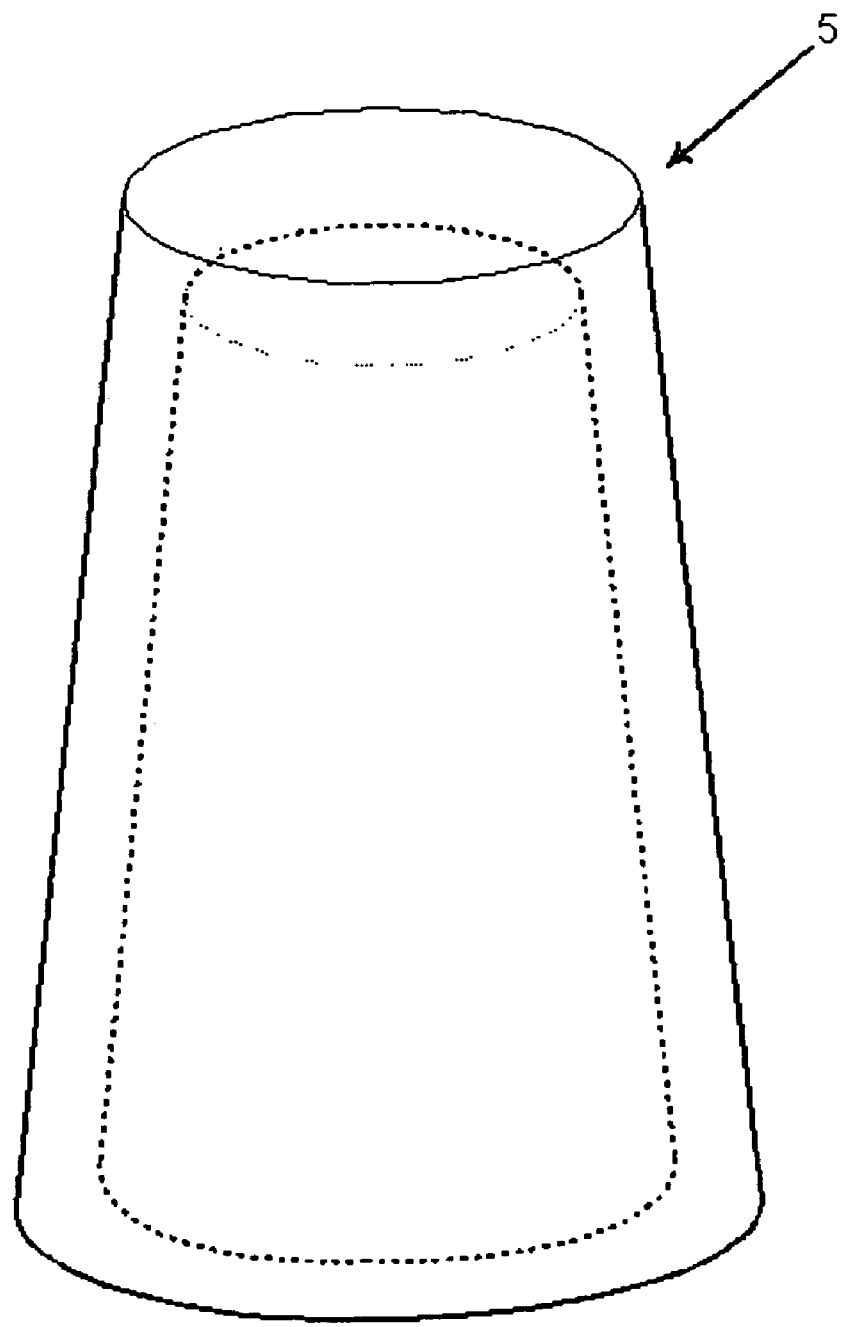
FIG. 1 is a perspective view of an exemplary liquid purification filter embodying the porous grog of the present invention.

The present invention relates to a composition for a porous grog (i.e., a very porous, pre-fired clay material). The body composition of the porous grog is a mixture of water, clay and combustible material. The body is fired and the firing causes the combustible material to burn off resulting in a porous earthenware. The porous earthenware may then be crushed to form the porous grog.

Clay, as used in this invention, means any fine-grained, firm earth material that is plastic when wet and hardens when heated. The clay utilized by the present invention is plastic and moldable when mixed with water, retains its shape on drying, and becomes permanently hard on heating or firing, and/or cannot be broken down by water after firing. Non-limiting examples include white clay, clays that fire reddish, (i.e. terra cotta) yellow clay, black clay and combinations thereof. Clays that fire reddish can be found almost anywhere in the world, thus making them a convenient and practical source of clay. Therefore, in an embodiment of the present invention, clays that fire reddish are utilized as the clay in the body composition. Preferably, the clay has a mesh size (i.e., number of holes per linear inch of a sieve screen) of at least about 10 mesh. More preferably, the clay has a mesh size of at least about 30 mesh. In alternate embodiments the mesh size is 60 mesh.

The combustible material may be any material which burns off during firing to create voids in the earthenware and provide the earthenware with its porosity. Organic materials of plant or animal origin have been found to have properties which provide suitable burn off during firing. Examples of combustible material include, but are not limited to, grain flour, sawdust, sorghum, rice flour, rice husk, millet husk, milled corn cobs, or a combination thereof. In particular, grain flour is a preferred combustible material. Wheat flour is widely prevalent as an inexpensive resource. Thus, in an embodiment of the present invention, wheat flour is used as the combustible material. Preferably, the combustible material has a mesh size from about 100 mesh to about 650 mesh. More preferably, the combustible material has a mesh size from about 250 mesh to about 450 mesh. Most preferably, the combustible material has a mesh size of about 350 mesh.

The amount of water, clay and combustible material utilized in the mixture will vary depending upon the amount of porous grog sought and the desired permeability of the porous grog. Generally, in a preferred embodiment, the amount of clay added to the mixture is about 40% to about 80% by weight and the amount of combustible material utilized is about 20% to about 60% by weight. In a more preferred embodiment, the amount of clay added to the mixture is about 50% to about 70% by weight and the amount of combustible material utilized is about 30% to about 50% by weight. In a further preferred embodiment, the amount of clay is about 60% by weight and the amount of combustible material is about 40% by weight. In a most preferred embodiment, the amount of clay is about 63% by weight and the amount of combustible material is about 37% by weight. The amount of water utilized is at least the amount necessary to sufficiently allow a uniform mixing of the clay and combustible material. However, not so much water should be added that the clay particles pull together, which cuts porosity.

In a preferred method of mixing together the clay and combustible material, water is first mixed with the clay. In an embodiment of the present invention, the clay and water combination is then allowed to stand for about zero to about 24 hours to permit the combination to become sufficiently plastic. In another embodiment of the present invention, the clay and water composition is then allowed to stand for about zero to about six hours to permit the combination to become sufficiently plastic. In a preferred embodiment, the clay and water combination is allowed to stand for about 1.5 hours to about 4.5 hours. In a more preferred embodiment, the clay and water combination is allowed to stand for about three hours. In another embodiment, the amount of time the clay and water composition is allowed to stand depends on the water content of the combination. In this embodiment, the higher the water content the less time is required before the combination is sufficiently plastic. When the clay and water combination is considered to be sufficiently plastic, the combustible material is mixed into the clay and water combination. Mixing alternated with size reduction by breaking the larger particles is helpful to ensure uniform distribution of the combustible material throughout the clay and water mixture. Following mixing, the mixture may be spread out to dry until it has the correct moisture content for pressing. In a preferred embodiment of the present invention, the mixture may be pressed into a form or forms conducive to efficient firing, the fire circulating within close proximity of the grog ware. For example, in one preferred method, the mixture is spread out and allowed to dry until the moisture content of the mixture is less than about 15% by weight. In a more preferred method, the mixture is spread out and allowed to dry until the moisture content of the mixture is about 8-10% by weight. The mixture is then dry pressed into forms or shapes which are conducive to efficient firing, the fire circulating within close proximity of the grog ware. In a preferred embodiment, the dried mixture is pressed into a cylindrical mold, released from the mold and then fired. It has been found through experimentation that disk shapes facilitate stacking in a kiln and allow uniform exposure to heat.

After the body composition of water, clay and combustible material has been properly mixed but prior to firing of the composition or disks, it may be necessary for the composition or disks to be allowed to dry to a moisture content appropriate for firing. Preferably, the composition or disks are allowed to dry for about zero to about four days. More preferably, the composition disks are allowed to dry for about two days.

Grog can also be processed out of particulate, recycled purifier material. This allows a normal percentage of reject candles, implicit to the production process, to be crushed then sized as the appropriate grog material. Thus the grog of recycled candles can comprise 0 to 100% of a subsequent purifier production batch.

Firing is a technique and procedure well known to those skilled in the art. For example, the disks may be fired in a kiln or other similar pottery oven. Kilns and firing technology are well known to those of skill in the art and are well described in literature such as *The Kiln Book, Materials, Specifications and Construction*, by Frederick Olsen (Chilton Book Co., second edition, 1983).

Firing begins slowly at a preliminary firing temperature, especially through the ignition point, between about 500 to 600° C. The preliminary firing temperature is a temperature at least great enough to burn off the combustible material but not proceeding through this 500 to 600° C. range so quickly as to cause the grog disks to bloat and/or break. If grog breaks up to a particulate during the firing, then the inner most portion of the grog pile will not have received the correct firing temperature. Thus, the under fired grog material will be shrinking slightly, during subsequent, purifier firing. This may inhibit optimal flow rate. The bloating or breakage that occurs at these firing temperatures above the preliminary firing temperature inhibits the unique porosity characteristics exhibited in the resultant fired porous grog of the present invention and is in contrast to the objects of the present invention. If grog breaks up to a particulate during the firing, then the inner most portion of the grog pile will not have received the correct firing temperature. Thus the under fired grog material will be shrinking slightly, during subsequent, purifier firing. This may inhibit optimal flow rate. After the combustible material has burned off, the firing may be allowed to proceed at a rapid pace to a temperature higher than the preliminary firing temperature, up to 800° C. or greater, to the maturation temperature of earthenware, about 1000 to 1050° C.

Firing continues until the body matures into earthenware and/or until the disks or compositions can no longer be broken down by water. Maturing temperatures and times typically depend upon the properties of the specific kiln, pottery oven or firing device used. However, such properties are usually easily ascertainable by a user and determining the maturing temperature and time particular to a specific firing device does not require undue experimentation by one skilled in the art. Generally, a sufficient temperature sufficient not to be broken down by water is at least about 500° C. and the composition or disks will be fired for at least about three hours. For example, a standard cylindrical red brick kiln is described in *An Improved Bonfire Kiln*, by the Organization Intermediate Technology of Kenya. Using such a kiln, the mixture should mature into earthenware after about four to six hours of firing at temperatures up to about 700° C. Following firing, the earthenware is crushed to create granules of porous grog. As the combustible material has been burned off during the firing, the granules of porous grog will contain voids, spaces or air pockets. Maturing temperatures and times also typically depend upon properties of the particular clay material. For example, in an embodiment of the present invention, the maturing temperature and times for the clay material depend upon the amount of iron contained in the clay material. In this embodiment, a higher amount of iron results in a lower maturing temperature and vice versa.

The present invention further relates to a water purification filter that can be made using the porous grog. The unique permeability characteristics of the porous grog provide the filter with a greater flow rate than other known earthenware filters while still maintaining a pore size small enough to remove about 99% of particles of all sizes down to about 1.0 micron. One reason that the porous grog improves the permeability is that the clay material of the present invention is generally "damp pressed" (i.e., pressed with a relatively low water content). Because the clay material has a low water content, the particles are pushed apart by a kind of friction. By contrast, the clays of up to that are popularly used for throwing and hand building ceramics are moist clays of up to around 30% water content. For these moist clays, the particles are pulled together more tightly and the water flow rate through the fired clay material is thereby inhibited.

To produce the water purification filter, porous grog is mixed with water, clay and combustible material. This mixture is pressed in a set of dies, removed and fired to create an earthenware water purification filter. In a preferred embodiment, upon removal from the mold, the water purification filter is cleaned of any seams resulting from the set of dies and may also be burnished (i.e., the surface of the filter may be smoothed by rubbing with a hard object to give a finish with a smooth effect). It has been found through experimentation that burnishing the filter improves the surface strength of the filter.

As with the body composition of the porous grog, the clay of the water purification filter may be any fine-grained, firm earth material that is plastic when wet and hardens when heated. Additionally, as in the clay of the body composition of the porous grog, the clay utilized in the filter is plastic and moldable when mixed with water, retains its shape on drying, and becomes permanently hard on heating or firing. The clay utilized to make the water purification filter may be of the same type and size as that used in the porous grog. However, the clay utilized in the body composition of the water purification filter does not necessarily have to be of the same type and size as that used in the porous grog. In a preferred embodiment, clays that fire reddish are utilized in the body composition of the water purification filter.

As with the body composition of the porous grog, the combustible material may be any material which burns off during the firing of the filter leaving a plurality of spaces, voids or air pockets. The combustible material utilized to make the water purification filter may be of the same type and size as that used in the porous grog. However, the combustible material utilized in the body composition of the water purification filter does not necessarily have to be of the same type and size as that used in the porous grog. In a preferred embodiment, the combustible material is of plant or animal origin. In a further preferred embodiment, the combustible material is grain flour. Wheat flour is available almost everywhere in the world. In addition, wheat flour has proven effective in achieving a good flow rate. Thus, in an even further preferred embodiment, the combustible material is wheat flour.

In the production of purifiers the composition ratios of the clay, porous grog and combustible material will vary depending upon the resultant filter permeability desired. In a preferred embodiment, the composition contains between about 30% and about 60% by weight of clay, between about 30% and about 60% by weight of porous grog and between about 5% and about 20% by weight of combustible material. In a more preferred embodiment, the composition contains about 45% by weight of clay, about 45% by weight of porous grog and about 10% by weight of combustible material.

The mesh size of the composition components may be varied depending on the attributes of the local clay, the amount of shrinkage of the clay, or the amounts of porous grog and combustible material. Further, the mesh size utilized will be dependent upon the desired resultant permeability of the water purification filter. In a preferred embodiment, the mesh size of the clay and grog is at least about 20 mesh. In a further preferred embodiment the mesh size of the clay and grog may be about 60 mesh. In a more preferred embodiment, the mesh size of the clay and grog is at least about 30 mesh.

In the grog production, preferably, the combustible material should be of a very fine grain so that the combustible material will burn off during firing and leave a plurality of voids which improve the permeability of the filter. In a preferred embodiment, the combustible material is from about 100 mesh to about 650 mesh. In a more preferred embodiment, the combustible material is from about 250 mesh to about 450 mesh. In an even more preferred embodiment, the mesh size of the combustible material is about 350 mesh.

Preferably, the percentage by weight of water added is not so excessive as to inhibit good flow. In a preferred method, the mixture, following mixing, may be allowed to dry to a water content of about 25% or less by weight before the mixture is pressed. In a more preferred method, the mixture, following mixing, may be allowed to dry to a water content of about 8 to 15% by weight before the mixture is pressed. Or in either case the mixture may be mixed at the correct percentage water, without the need for further drying. This "damp press" material of a body containing a relatively low water content by weight is in contrast to the conventional moist clay of a body containing up to about 30% water content by weight and is a factor in the increased permeability of the water purification filter. Preferably, following removal from the set of dies and any optional cleaning or burnishing, the filter is allowed to dry before firing. More preferably, the amount of water added to the mixture prior to pressing is such that, following removal from the set of dies, the filter requires not more than about four days to dry before it is ready for firing. Or the filters can be dried for zero to two days.

Firing of earthenware is a process and technique that is well known to those skilled in the art. Though not required, the filter may be fired using the same procedures, temperatures, firing devices, and time periods as those previously described for the firing of the porous grog. In a preferred method of firing, the temperature is sufficiently high to cause the combustible material of the purifier composition to burn off, the purifier to subsequently mature into earthenware or until the material can no longer be readily broken down by water. Preferably, the firing is at a temperature of at least about 500° C. More preferably, the firing is at a temperature of about 600° C. Even more preferably, the firing is at a temperature of about 700° C. Most preferably, the firing is at a temperature of about 950° C. to about 1100° C. Generally, in a preferred embodiment, the firing will last for at least about three hours to about 24 hours, depending in large part on the size of the kiln.

In another embodiment, flour was used as the combustible material. Following mixing, the water was dried off over a two to four hour period for a final water content of about 15%. When mixing the ingredients, it is preferred that the 63 parts of clay powder is first mixed with the 20 parts water and stored in a closed bag over night, helping to restore some of the plasticity which is lost when a clay powder is drying. Preferably, the clay, flour and water are not mixed together at the same time, to prevent the flour from adsorbing all the water prior to its minimal wetting of the clay.

Following overnight storage in the plastic bag, the 83 parts clay/water was mixed with the 37 parts of flour. The mixture will initially appear white due to the flour adhering to lumps of clay, however as the lumps are worked out the mixture darkens. After working out the lumps the mixture was pushed through a 10 mesh screen, to assist with the removal of the bigger lumps of clay. The mixture is then spread out on a plastic to dry back to approximately 15% water content.

Following the drying, the material is then ready for pressing into grog. Alternatively the material may be stored in a closed bag until needed, however, it is preferably used within 24 hours. A car jack, screw press, or the like, is used to press 1.0 cm. thick disks, appropriate for stacking in the kiln, although any similar device could be used, given that it will provide the appropriate amount of pressure. The grog, was then ready for drying, whether in the open air or in an oven. In the subsequent kiln firing the temperature is raised slowly to prevent bloating and uneven firing which causes the disks to crumble into powder. This would happen in through the range of about 400 to 600° C., the ignition temperature of flour. The burnout of all the flour, is typically indicated by a lot of smoke, and then the kiln may be turned up quickly. Following the firing, the grog disks are then crushed to 10 mesh. While all the strength of a fired earthenware is present, there is less 'spot welding' (the bonding of adjacent clay particles, brought about by firing) so crushing the grog disks is not difficult.

The final composition for the purifier depends to some extent on the clay used. Black clays require less flour than those that naturally occur as red, yellow, and white etc. This is because many black clays already contain a small percentage of organic material (combustible material). In another embodiment where the clay is not black clay the final composition could be 50% grog, 40% clay and 10% flour. The purifiers are pressed then fired, and colloidal silver applied thereafter.

For the purifier composition it should be noted that for black clays by comparison with clays that are not black there is a substantial increase in the rate of flow for only a small additional amount of flour. For example, 37% flour to 63% black clay gives double the rate of flow of the non black clay of the same composition. This means that to get the same rate of flow, as per the composition of the grog, the black clay should contain 30% flour to 70% clay.

In the last step of the forming process for appropriate technology filter candles, to insure the green strength necessary to forming at this stage, it is important to increase minimum water content to about 8% through water of up to 15%, or more is acceptable.

Figure 13:
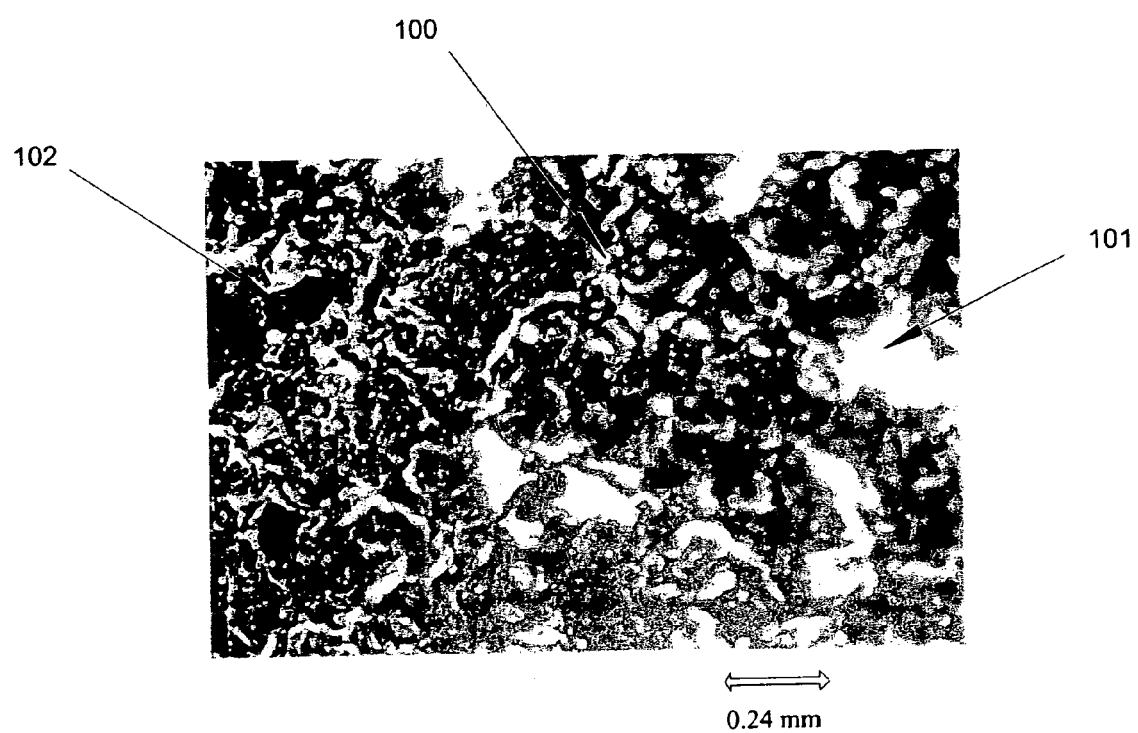
FIG. 13 is a micrograph of the fired purifier medium at 5×.
Figure 14:
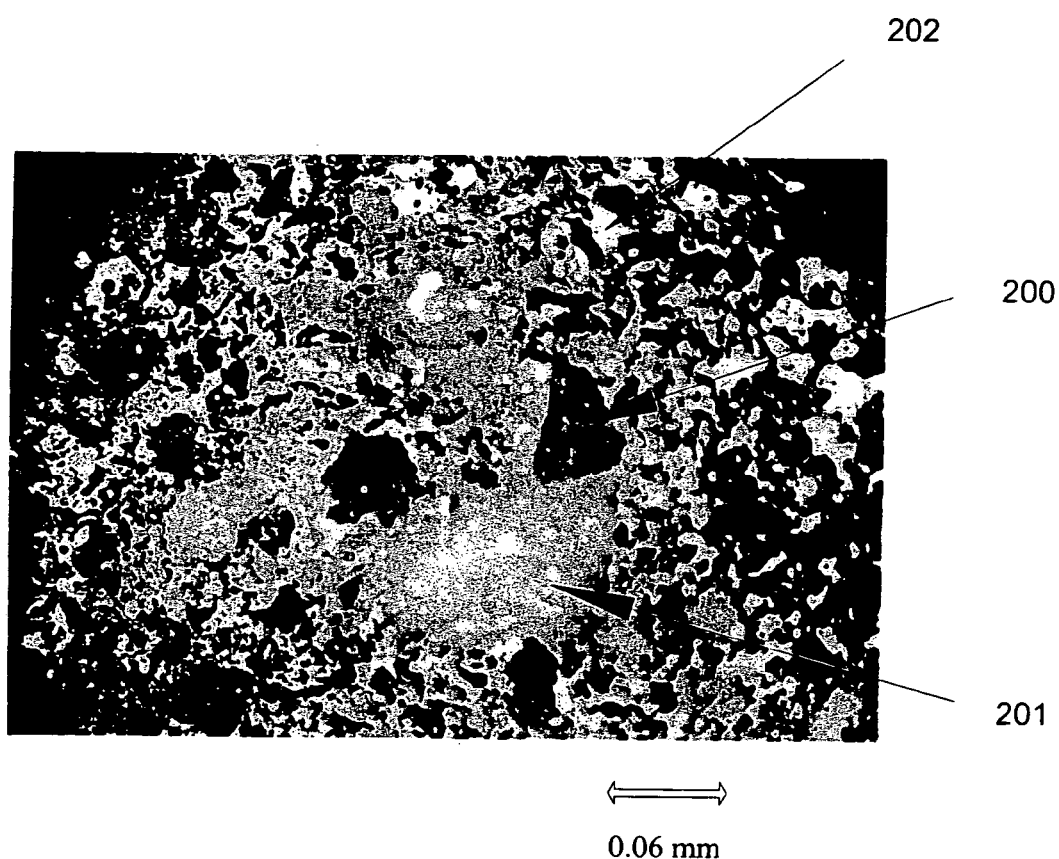
FIG. 14 is a micrograph of the un-fired purifier medium at magnification 20×.

As shown in FIGS. 13 and 14, for permeable grog purifiers, looking under the microscope it is clear that with respect to permeability the filter medium is not entirely homogeneous. The micrographs indicate that permeability varies from clump to clump, or particle to particle within the purifier. The most permeable material is the porous grog, the least permeable the plastic clay necessary in facilitating forming of the resultant porous grog composition. Control over final permeability comes in formulating a mix of materials, an averaging that ends up giving the desired flow, the 1.0 to 1.5 liters per hour necessary to the needs of a small family, assuming a filter of volume about 350 ccs. At the same time, for larger families a filter of 500 ccs will give about ⅔ liters of filtered water per hour. The micrographs indicate in one embodiment the thickness of the pores is as much as about 100 microns, although one will appreciate that the thickness may be varied depending on the combustible material utilized and fabrication of the grog.

As shown in FIG. 13, the micrograph indicates a lot of elongated pores, those primarily involved in bringing about control over the amount of flow. Note that larger white areas indicate pores caused by burnout of a number of combined, grains of flour. Larger dark areas indicate some of the bigger particles of the 10 mesh grog.

As shown in FIG. 14, the red particles indicate the pre-fired grog, the yellow ones, the un-fired clay composition. Larger white particles show pores, where the composition was not fully compacted.

In large part the control over the rate of flow is aided by the proper mixing of particles of different permeability. However, more homogeneity may be considered desirable. The mixture of a plastic clay material with a glutinous bread like material, all with water, would appear to be unlike any other process in ceramics.

In another embodiment, the addition of combustible material would not always be necessary for achieving good flow allowing for simplified fabrication. In this simplified fabrication the grog itself comprises particles that are somewhat separated by their jaggedness. Without being held to the current theory, the applicant hypothesizes that the size and shape of the pores result from the shrinking away that happens between the previously fired and not previously fired particles. This appears to bring about a network of pores that is of primary importance to the permeability.

In another embodiment, 60 mesh sawdust can be used instead of the wheat flour. In another embodiment, brick dust, or particulate brick of approximately 30 mesh, is used in place of grog. In this embodiment the brick dust may be combined with flour, sawdust or similar combustible material in order to get the appropriate candle composition.

In another embodiment, for the appropriate flow rate, permeability may be varied by making changes the combination of the following, for example: (a) the ratio of flour to clay in the grog composition; (b) the addition of a bit of combustible material (i.e. flour, sawdust, brick dust) in the candle composition (e.g. 50% grog, 40% clay, and 10% flour) and/or, (c) the amount of water used in either the grog or the candle compositions. This could normally be 13% to 20% water, but could be as low as 5% and as high as 35 or even 40%. Furthermore, (d) increased firing temperature will bring about increased flow, and decreased firing temperature will bring about decreased flow.

Non-limiting examples of combustible material that may be added to the present invention include: grain flour, sawdust, sorghum, rice flour, rice husk, rice husk ash, millet husks, milled corn cobs, powdered earthenware which was previously fired, for example brick dust, broken earthenware, and bisque earthenware. It should be understood that these combustible materials may be used alone or in combination with other combustible materials.

A small amount of silver material is applied to the earthenware following firing. This silver material causes an oligodynamic action whereby micro-organisms are starved of oxygen and killed or disabled when they make contact with silver particles, or are in close proximity. The silver material also has an electric charge which can cause the internal protoplasts of pathogens to collapse. Further, colloidal silver can render pathogens unable to reproduce and can kill parasites while in their egg stage. Thus, silver material, when applied to the water purification filter, acts as a disinfectant in addition to preventing regrowth of bacteria within the purifier wall. The silver material may be applied in its colloidal form or as silver nitrate. When silver nitrate is applied, the filter should be fired for a second time, in reduced oxygen at the upper temperature, around 475° C. At this temperature the nitrates to burn off, the reduction promoting a silver metal bond to the ceramic. When colloidal silver is applied, there is not a need for a second firing, the disinfectant being silver oxide.

Through experimentation it has been found that amounts of colloidal silver as low as 100 to 200 ppm of silver solution aid effectiveness in providing potable water. Membrane filtration testing for bacteria has shown that the earthenware filter of the present invention when combined with silver material yields purified water with no visible petri-dish bacteria. By contrast, the earthenware filter of the present invention without silver material yields purified water with 20 petri-dish bacterial colonies, depending on initial contamination levels. For example, control filters generally remove only about 80% of e-coli. Membrane filtration testing of the unpurified, raw water used in the earthenware filter tests indicate an uncountable number of petri-dish bacterial colonies.

In an additional embodiment of this invention, a method of depositing silver chloride on the earthenware water filter is disclosed. Further, methods of use of silver chloride as a versatile disinfectant on a wide variety of applications are also disclosed.

Recent lab test results indicate that in order for the porous grog purifier to be 100% effective at removing *Escherichia coli* (*E-coli*), a lot more silver than the 200 part per million (ppm) used for other slower types of filters can be required, especially at increasing flow rates, as for example, by increasing water column height. When the flow rate per surface area is as high as that of the pottery purifier, and at the increased column heights a small percentage of *E-coli* may become dynamic, or at least nimble enough to pass through the porous grog into the filtered water as there is inadequate time for the bacteria to be trapped by the porous grog ceramic as well as insufficient exposure time to the colloidal silver for the oligodynamic reaction to take place.

In order to overcome this problem, one possible approach is to increase the amount of silver in the purifier. It should be noted that colloidal silver (hereinafter "CS") saturation has had widespread use in the production of other kinds of low-temperature filters. When the CS dries out within the medium, it leads to silver oxide stuck within the pores of the ceramic. Although colloidal silver is an excellent choice for removing the *E-coli* and other micro-organisms (which may include fungus or parasite, or other species of bacteria such as *Streptococcus faecalis, Legimella pneumophilia, Yersinia enterocolitica, Staphylococcus aureus, Pseudomonas aeruginosa, Klebsiella terrigena* or *Salmonella typhi*), there can be a serious disadvantage from the standpoint of cost. Since CS is imported it tends to be expensive or difficult to acquire. Therefore, it is desirable to be able to produce some other forms of silver compounds, a form that also gives tiny particles.

In an alternate embodiment to the colloidal silver (CS) treatment, a low cost, no heat treatment, room temperature method of applying silver chloride (AgCl) may be performed. Like colloidal silver, silver chloride is a known disinfectant and has been used in combination with other chemicals for the treatment of water. For example, King in U.S. Pat. No. 6,217,892 teaches a regenerative water treatment method using zinc and silver chloride composition. Adachi et al. in U.S. Pat. No. 5,342,528 teach a method of purifying water containing an activated carbon having silver and/or an inorganic silver compound and an alkaline earth metal salt.

Figure 5:
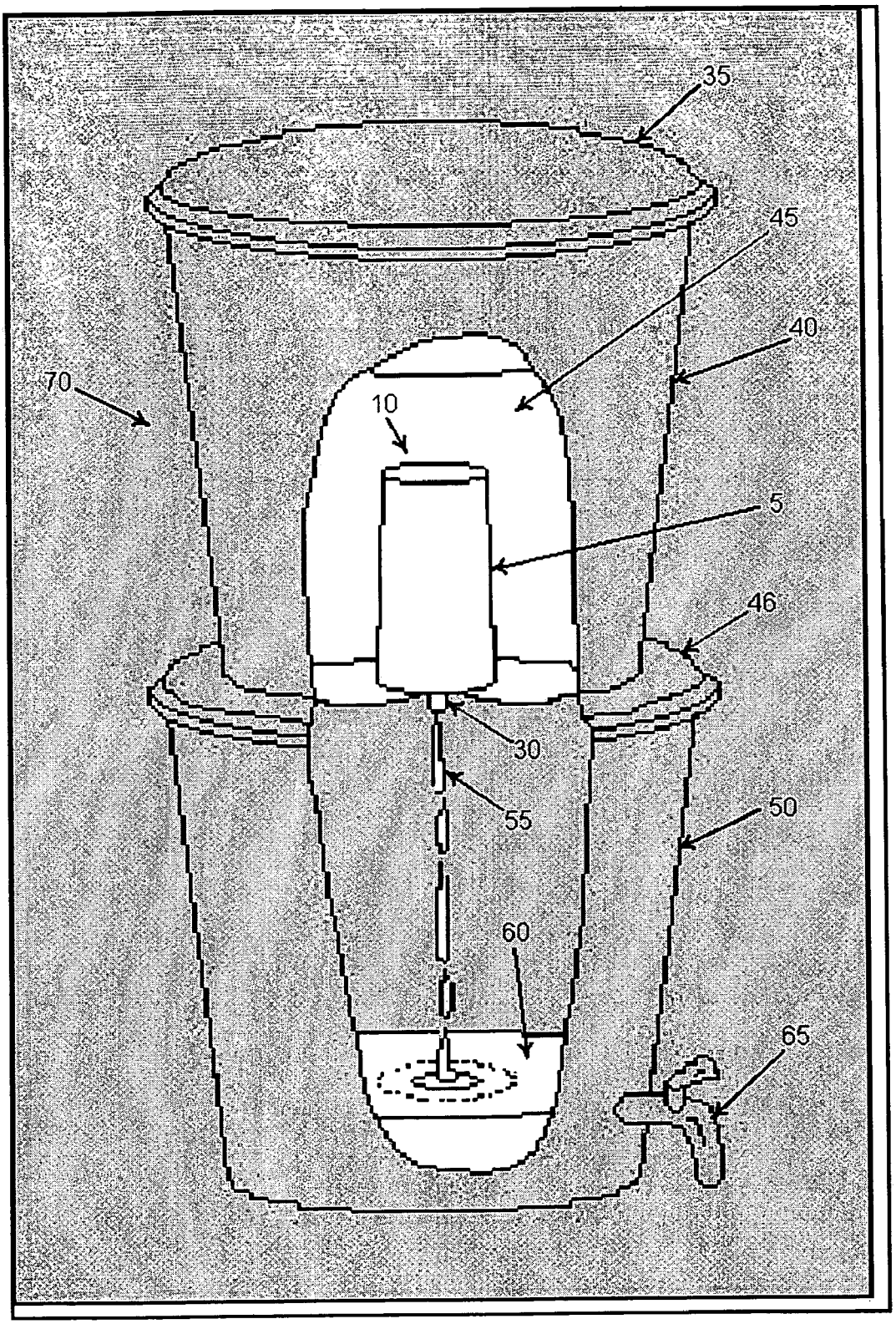
FIG. 5 is a perspective view, with portions in section, of an exemplary liquid purification system incorporating the liquid purification device of FIG. 3 and FIG. 4.

While the use of silver chloride as a disinfectant is old in the art, its method and use in the porous grog pottery purifiers represent a novel application in producing disinfected water to the rural poor at a very low-cost. The water disinfection treatment of this embodiment comprises a method of depositing silver chloride particles into the porous grog ceramic purifier. The method involves finding a good quality, silver-free, porous grog ceramic purifier, saturating it with silver nitrate ($AgNO_3$) and then drying it. After inserting these silver nitrate candles into the two-tiered purifier system as illustrated in FIG. 5, the upper container is filled with saturated salt water (NaCl). Thus, running salt water through the candle leads to the deposition of silver chloride (AgCl) into the ceramic, while the nitrate salt ($NaNO_3$) is flushed away in the following reaction: $AgNO_3+NaCl \rightarrow AgCl+NaNO_3$. This method replaces soluble silver nitrate with a relatively insoluble silver chloride. Further, the method does not involve subsequent firing unlike the method of depositing colloidal silver by heating $AgNO_3$ described in an earlier embodiment. (It should be noted that silver chloride has a solubility of $8.9 \times 10^{-5}$ grams per 100 cc in cold water. By way of comparison, one form of silver oxide has a solubility of $1.3 \times 10^{-3}$ grams per 100 cc in cold water).

For the current purifiers with $AgNO_3$ and AgCl treatments, some forty membrane filtration tests have indicated that these alternatives should be highly effective toward *E-coli* removal. In the case of silver chloride candles, thirty were tested, and all indicated 100% removal of *E-coli*. Eleven candles were tested as control purifiers, containing no silver, and nine of these were not 100% effective. The average *E-coli* removal rate for these nine candles was 98%. These figures are illustrated in the table below.

TABLE I

| A. | B. | C. | D. |
|---|---|---|---|
| AgCl | AgCl | AgCl | No Silver -Control- |
| from 0.5 grs. $AgNO_3$ | from 0.44 grs. $AgNO_3$ | from 0.25 grs. $AgNO_3$ | 0 grs. $AgNO_3$ |
| 100% removal of *E-coli* | 100% removal of *E-coli* | 100% removal of *E-coli* | 98% removal of *E-coli*. |

For the four groups of purifiers A through D, the expected flow rate per candle is about 1.5 liters/hr. Because the process of "A" involved too high a cost due to too much silver, the process was proceeded with further testing with lower concentrations of silver. The results of purifiers "B" and "C" showed a sufficiently low cost of silver per purifier, which still indicated 100% effective removal of *E-coli*. The control group of purifiers "D", without any AgCl showed that it was only 98% effective in removal of *E-coli*. Also, a 100% removal of *E-coli* was found with two groups of purifiers containing both silver chloride and colloidal silver. Additionally, these purifiers have the advantage of a low cost of production, wherein the cost of the silver per purifier come to only about US $0.03.

In another embodiment to the method of silver chloride disinfection of porous grog purified water, an elementary particulate grog purifier may be created with crushed red-brick particulates substituted for the porous grog, especially where a porous grog purifier system may not be readily available such as in a disaster-stricken area, where there is an urgent need for clean and disinfected drinking water. Red brick is commonly available in many parts of the world, which is inherently porous and can be a good substitute for the kiln fired porous grog.

The method of preparing the particulate purifier, by comparison with a sold purifier is described below:

a) Locating some good quality, red brick;
b) Crushing said red brick to about 30 mesh (which could be jobbed out to an agricultural hammer mill);
c) Placing the crushed grog into a container and saturated it with silver nitrate salt about 1 mg per 1.0 cc of particulate grog;
d) Drying the particulate grog on an open surface in subdued light;
e) Pouring the dried silver nitrate $AgNO_3$ saturated grog into said container filled with salt water resulting in deposition of AgCl on the grog particulate;
f) Running tap water through this purifier unit to flush away any remaining salt and readying it for use.

Thus, this elementary simplified version of the particulate grog purifier units may be constructed without the need for kilns or any other substantial investment. Preferably the red brick chosen for this simplified version has good strength and porosity. While porous grog is superior for purifying water, red brick grog would be made readily available as it does not need subsequent firing, and therefore is a low cost substitute for delivering water to the disaster-stricken victims. In alternate embodiment, the red-brick grog may be substituted or mixed with porous grog particles of 10-100 mesh. In alternate embodiment, the container may comprise of pottery, plastic or metallic containers such as aluminum, steel, copper or brass.

Although the main embodiments of this present disclosure comprises the alternative method of silver chloride disinfection of the porous grog water purifier device, this method of sanitation may be adaptable and applicable to treat and disinfect several other areas where hygiene and cleanliness are important on open surfaces such as in toilets. In another embodiment of the present disclosure, AgCl may be treated on to surfaces of pottery toilet liners to render the toilet bacteria free especially in the so-called less developed countries where the pit-latrine is more prevalent, and where sanitary surfaces must be of minimal cost. One of the advantages of this pottery toilet is that the production and installation of such toilet liners is so simple that it can be undertaken almost anywhere. The pottery toilet liner comprises primarily of clay and water. The porous surfaces around pit latrines are a breeding ground for bacteria, and appropriate low-cost sanitation alternatives are lacking. The present disclosure addresses this problem and provides a remarkably inexpensive and easy method of silver chloride treatment to sanitize the surfaces around the openings of pit latrines. Further, the pottery toilet liner treated with silver chloride would cost under US $1.00, thus providing an affordable alternate disinfectant to the rural poor.

One of the great advantages of these toilet liners is that they can be fired in traditional, low fire kilns of village potters, up to a temperature of 600° C. Such low temperature is possible because fracture strength is generally not an issue. Thus, the higher temperature that is needed to fire the pottery water purifiers becomes unnecessary. For example, the toilets can be fired in lowest tech, traditional kilns, whether on open fire, bon fire or bee hive kiln. However, the liners may also be fired at temperatures higher than 600° C.

Further, it should be quite feasible to undertake the silver chloride treatment under the supervision of high school chemistry departments or even local pharmacies. Then the liners are mortared in place, in much the same way that tiles are set, using a simple concrete mortar. This method appears to be quite appropriate for such low temperature fired pottery toilets.

After firing the toilet liner, this is treated with silver chloride according to the following method. First, it is saturated with silver nitrate and then dried. The dried toilet liner then contains dispersed silver nitrate salts of small size. Second, the toilet liner is saturated with salt water (sodium chloride)

obtained from table salt. In the ensuing reaction, silver chloride is deposited and the remaining silver nitrate salts are flushed over time. In this process, soluble silver nitrate is replaced by relatively insoluble silver chloride, which remains within the pottery as the primary disinfectant that renders a sanitary surface to the pottery toilet.

Additional alternatives to this embodiment include the treatment of silver chloride on to pottery toilets, which resemble the conventional porcelain ones. These toilets include an 'S'-curve pipe, which contains water, thus isolating the room of the toilet from the container of the waste. Several models of such sanitary pottery toilets include the sit down toilet, as used in the west, and the low profile, squat toilet, as used in many countries of Africa, Asia, etc. Such sanitary pottery toilets are intended as a low cost alternative to glazed porcelain ones, which in their isolation from the waste provide an added degree of sanitation.

According to another embodiment of the present disclosure, AgCl may be applied to pottery containers, made by village potters fired to around 600° C.; containers used for storing water.

According to another embodiment of the present disclosure, silver chloride may be used to treat food preparation surfaces. For example, terra cotta tiles can be treated, for use in a counter top.

According to another embodiment of the present disclosure, silver chloride may be used in the treatment of grog/cement mortars and grouts. For example, AgCl treated grog powder can be mixed with cement to produce a mortar, which is appropriate for use between portions or tiles of food preparation surfaces. This includes treatment prior to the laying of the surface or treatment following the laying of the surface. In this case an existing, porous ceramic surface can be treated in situ. Alternatively, a mortar that has already set, and was not pre-treated, can then be treated with AgCl according to the method of the present invention.

According to another embodiment of the present disclosure, AgCl may be used to treat and disinfect existing brick and tile surfaces, in order to render these surfaces free of bacteria and other harmful microorganisms.

According to another embodiment of the present disclosure, silver chloride treatment may be treated on to porous surfaces that are non-ceramic. Thus, it may be possible to treat silver chloride on to surfaces of concrete and wood, plaster of paris, etc., because AgCl was found to be effective in making porous surfaces bacteria free.

Figure 2:
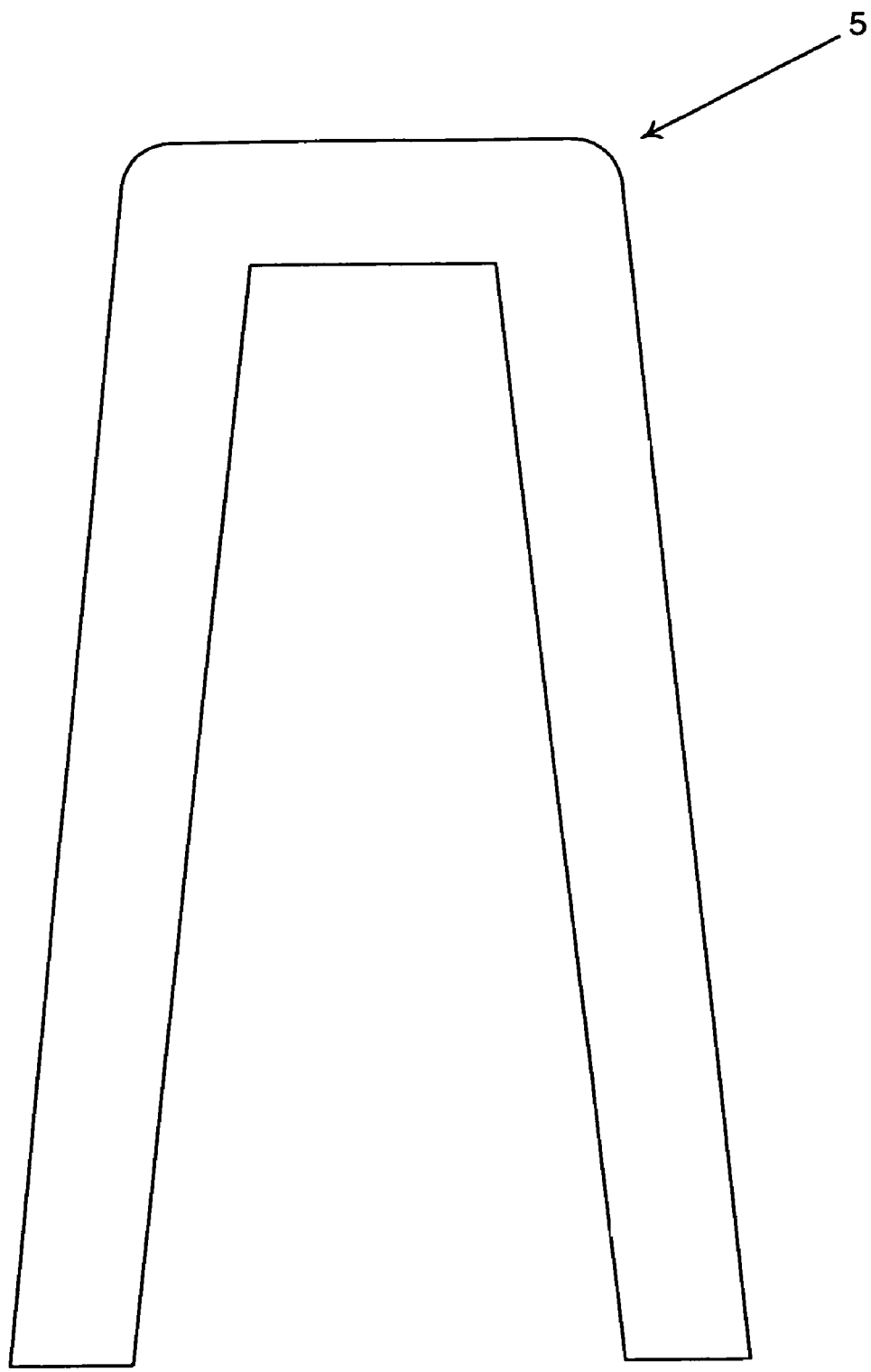
FIG. 2 is a cross-sectional side view of the liquid purification filter of FIG. 1.

Referring to the drawings, FIG. 1 shows a perspective view of a preferred shape for the water purification filter 5. FIG. 2 illustrates a cross-sectional side view of the preferred shape for the filter 5. Methods of creating a mold and die set which can press the body into the preferred shape illustrated in FIG. 1 and FIG. 2 are well known in the art.

Figure 3:
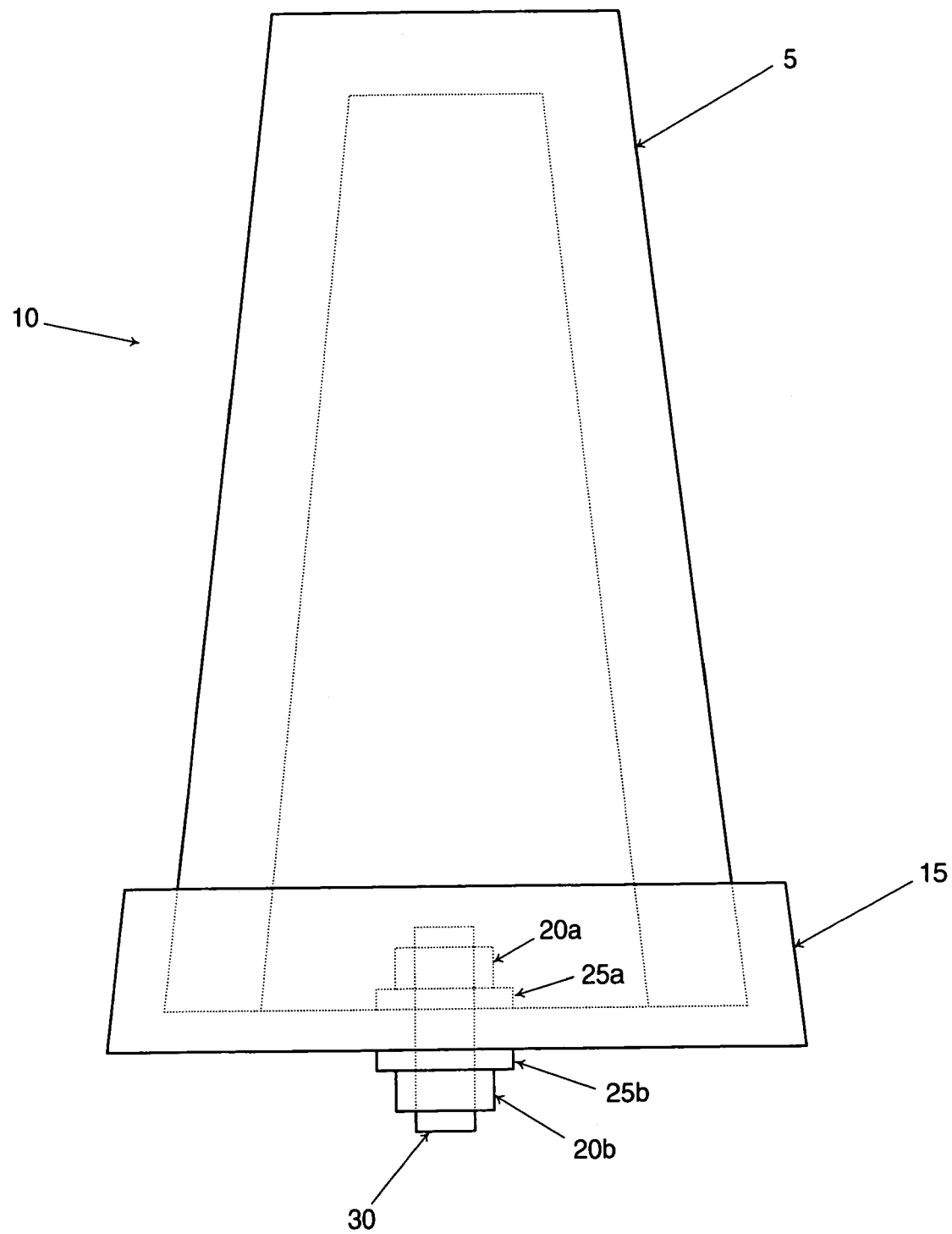
FIG. 3 is a cross-sectional side view of an exemplary liquid purification device incorporating the liquid purification filter of FIG. 1 and FIG. 2.

FIG. 3 illustrates a cross-sectional side view of a preferred embodiment in which the water purification filter 5, illustrated in FIG. 1 and FIG. 2, may be utilized in a water purifier 10. The filter 5 is attached to a cap 15. The filter 5 may be attached to the cap 15 using any suitable connection means known in the art. In a preferred embodiment, the filter 5 is attached to the cap 15 using a small amount of white cement, tile grout. In another preferred embodiment, the filter 5 is attached to the cap 15 using a wax sealant. In another preferred embodiment, the filter 5 is attached to the cap 15 using a gum sealant. In a further embodiment, the filter 5 is attached to the cap 15 using attachment straps or bolts which secure the filter 5 to the cap 15. The perimeter of the cap 15 should be sealed so that nonpurified water cannot circumvent the filter 5 and enter at the perimeter of the cap 15. The cap 15 may be made of any non-toxic material. In a preferred embodiment, the cap 15 is made of non-toxic plastic. In another preferred embodiment, the cap 15 is earthenware. In a preferred embodiment, the interior cavity formed by the filter 5 and the cap 15 may be filled with powdered porous grog. In this embodiment, the powdered porous grog may be coated with silver material. This silver material may be applied in its colloidal form, silver metal or as AgCl.

The cap 15 has a hole of sufficient diameter for a threaded tube 30. The tube 30 may be sealed and attached to the cap 15 by any appropriate means known in the art. The tube 30 may be composed of any material which is non-toxic. In an embodiment of the present invention, the tube 30 is composed of iron, brass, or plastic, which include external threads in one fixture. As illustrated in FIG. 3, the tube 30 is sealed to the cap 15 with washer 25a on the interior side of the cap 15 and washer 25b on the exterior side of the cap 15. Washer 25a and washer 25b are secured against the interior and exterior sides of the cap 15 by nut 20a and nut 20b. In an embodiment of the present invention, nut 20a and nut 20b fit on the external threads of tube 30 and tighten washer 25a and washer 25b against the cap 15. Alternatively, no nut is required inside the cap, where the cap and tube are inclusive in one part.

Figure 4:
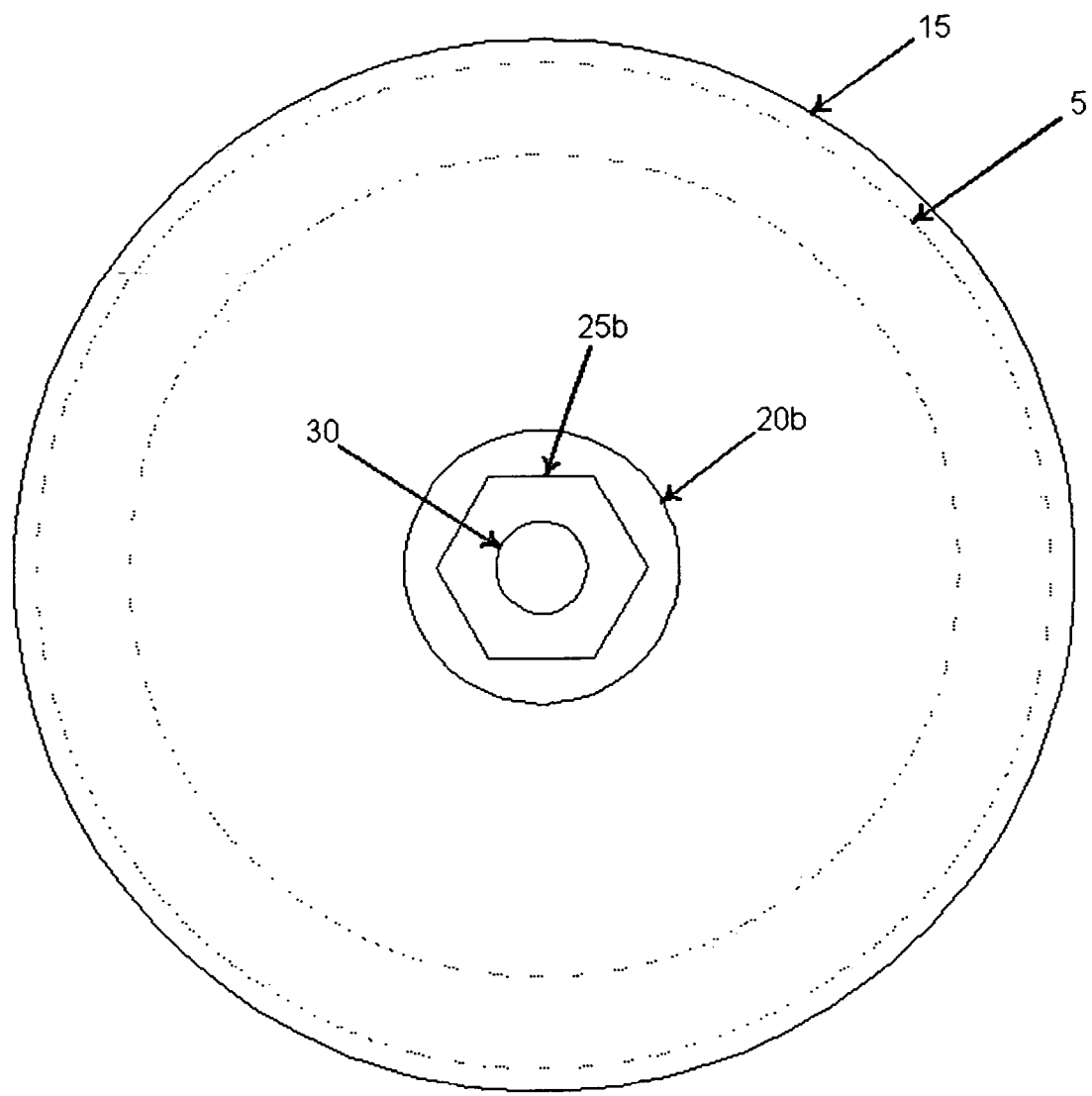
FIG. 4 is a cross-sectional bottom view of the liquid purification device of FIG. 3.

FIG. 4 illustrates a cross-sectional bottom view of the water purification filter 5 being utilized in the water purifier 10 of FIG. 3. The cap 15 is shown attached to the filter 5. The tube 30 is inserted through the cap 15. The tube 30 is sealed to the exterior side of the cap 15 by washer 25b. Washer 25b is tightened against the exterior of the cap 15 by nut 20b.

FIG. 5 illustrates a perspective view, with portions in section, of a water purifier system 70 utilizing the water purifier 10 of FIG. 3 and FIG. 4. The purifier 10 is contained in an upper reservoir 40. The upper reservoir 40 may be covered with an upper lid 35 to protect against evaporation, the elements and debris. The upper reservoir 40 has a hole of sufficient diameter to allow the insertion of the tube 30. The tube 30 is inserted through a hole in a lower lid 46 and passes into a lower reservoir 50. In this embodiment, the lower reservoir 50 has a pour spout 65.

Nonpurified water 45 is placed in the upper reservoir 40. The nonpurified water permeates through the filter 5 of the purifier 10 and exits the tube 30 as exit liquid 55. The exit liquid 55 falls into the purified liquid 60 which is contained by the lower reservoir 50. The pour spout 65 may be used to release the purified liquid 60.

In a preferred embodiment, the purifier system 70 is designed to have a flow rate through the purifier 10 of at least about 0.4 liter per hour. In a preferred embodiment, it may be necessary to periodically replenish the amount of nonpurified water 45 in the upper reservoir 40 to maintain a rate of flow of at least about 0.4 liter per hour.

While the water purifier system 70 illustrated in FIG. 5 is shown with one filter 5 and one purifier 10, the invention is not so limited and may utilize as few as one filter 5 or one purifier 10 up to as many filters 5 or purifiers 10 as will fit in the bottom of the upper reservoir 40.

Figure 6:
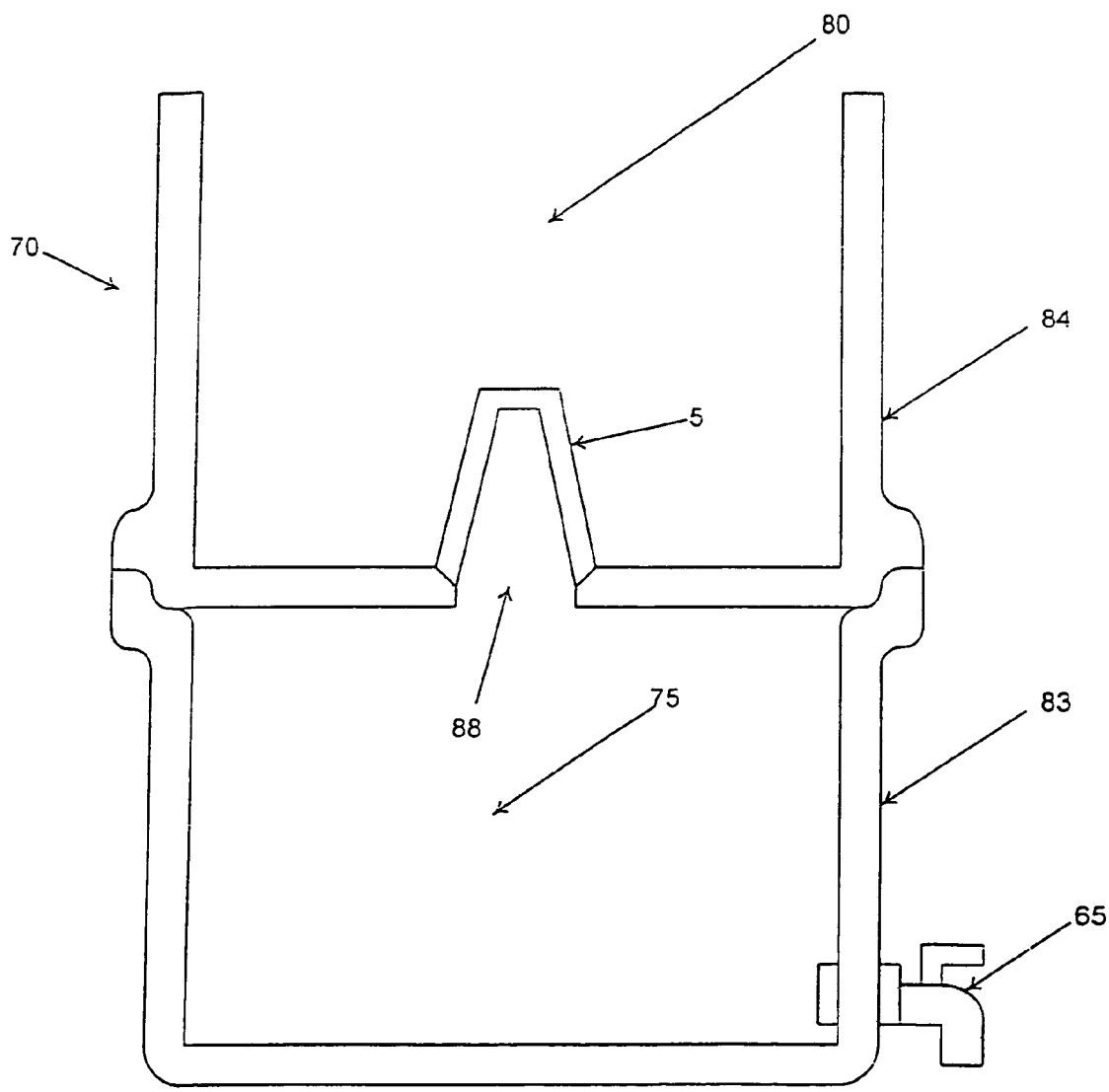
FIG. 6 is a cross-sectional side view of a further exemplary liquid purification system incorporating the liquid purification filter of FIG. 1 and FIG. 2.

FIG. 6 illustrates a cross-sectional side view of the water purification filter 5, illustrated in FIG. 1 and FIG. 2, utilized in a further exemplary water purifier system 70. The water purifier system comprises an upper container 84 which may be removably placed on a lower container 83. The bottom of the upper container 84 has a hole 88 into which fits the water purification filter 5. The filter 5 may be sealed against the bottom of the upper container 84 by any suitable sealing means known in the art. In a preferred embodiment, the filter 5 is sealed against the bottom of the upper container 84 using a small amount of silicone sealant. In another preferred embodiment, the filter 5 is sealed against the bottom of the upper container 84 using a wax sealant. In another preferred embodiment, the filter 5 is sealed against the bottom of the upper container 84 using a gum sealant. The perimeter of the edge of the filter 5 that is in contact with the bottom of the upper container 84 should be sealed so that nonpurified water cannot circumvent the filter 5 and enter at the perimeter of the edge of the filter 5.

Nonpurified water is poured into the upper reservoir 80 of the upper container 84. The nonpurified water permeates through the filter 5 and exits as purified water where it is collected in the lower reservoir 75 of the lower container 83. The purified water may be obtained from the lower reservoir 75 via a pour spout 65 which is connected through the lower container 83. In an embodiment of the water purifier system 70 illustrated in FIG. 6, the upper reservoir 80 may optionally be covered by a lid to protect the nonpurified water in the upper reservoir 80 against evaporation, the elements and debris.

The upper container 84 and the lower container 83 are composed of non-toxic, relatively water impermeable materials. In a preferred embodiment, the upper container 84 and the lower container 83 are composed of earthenware or plastic. The upper container 84 may be composed of the same type of material as the lower container 83. However, the upper container 84 and the lower container 83 do not necessarily have to be comprised of the same type of material. The upper container 84 and the lower container 83 may be of any shape and capacity which provide a flow rate through the filter 5 of at least about 0.4 liter per hour. In a preferred embodiment, the upper container 84 and the lower container 83 are cylindrical in shape. In a preferred embodiment, the capacity of the lower reservoir 75 of the lower container 83 is of sufficient volume to provide storage of an average daily drinking water requirements of a user or users yet not of so large of volume as to create a purified water retention time which would allow re-breeding of bacteria to occur.

Figure 7:
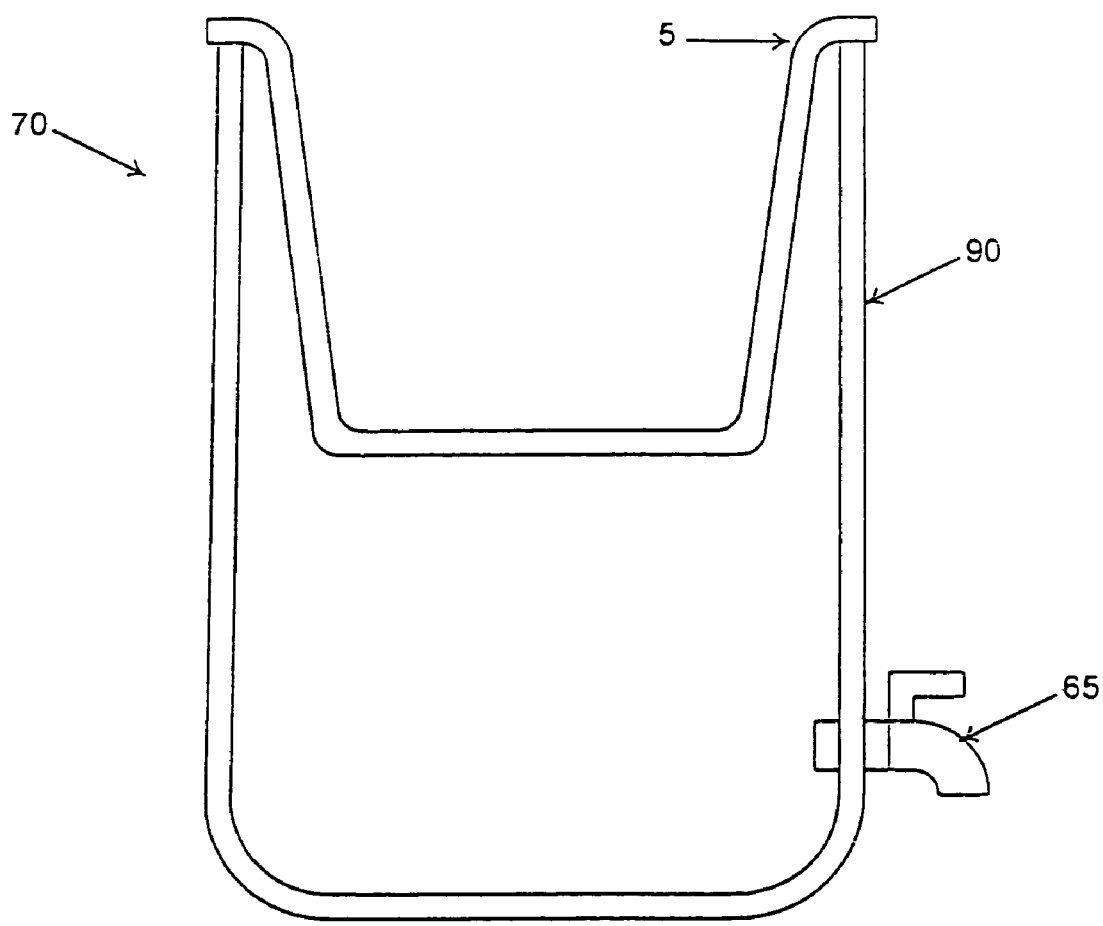
FIG. 7 is a cross-sectional side view of a further exemplary liquid purification system incorporating the porous grog of the present invention.

FIG. 7 illustrates a cross-sectional side view of an alternatively shaped water purification filter 5 utilized in a further preferred embodiment of the water purifier system 70. As illustrated, the filter 5 is removably placed on the reservoir 90. In a preferred embodiment, the filter contains porous grog in an amount between about 40% to about 60%, by weight, of the body composition. Optionally, the filter 5 may be covered with a cap or lid to prevent water contained in the filter 5 from evaporating or becoming further contaminated.

Nonpurified water is poured into the filter 5. The nonpurified water permeates through the filter 5 and exits as purified water which is collected in the reservoir 90. The purified water may be obtained from the reservoir 90 via a pour spout 65 which is connected through the reservoir 90. The reservoir 90 is composed of non-toxic, relatively water impermeable materials. In a preferred embodiment, the reservoir 90 is composed of earthenware or plastic.

Figure 8:
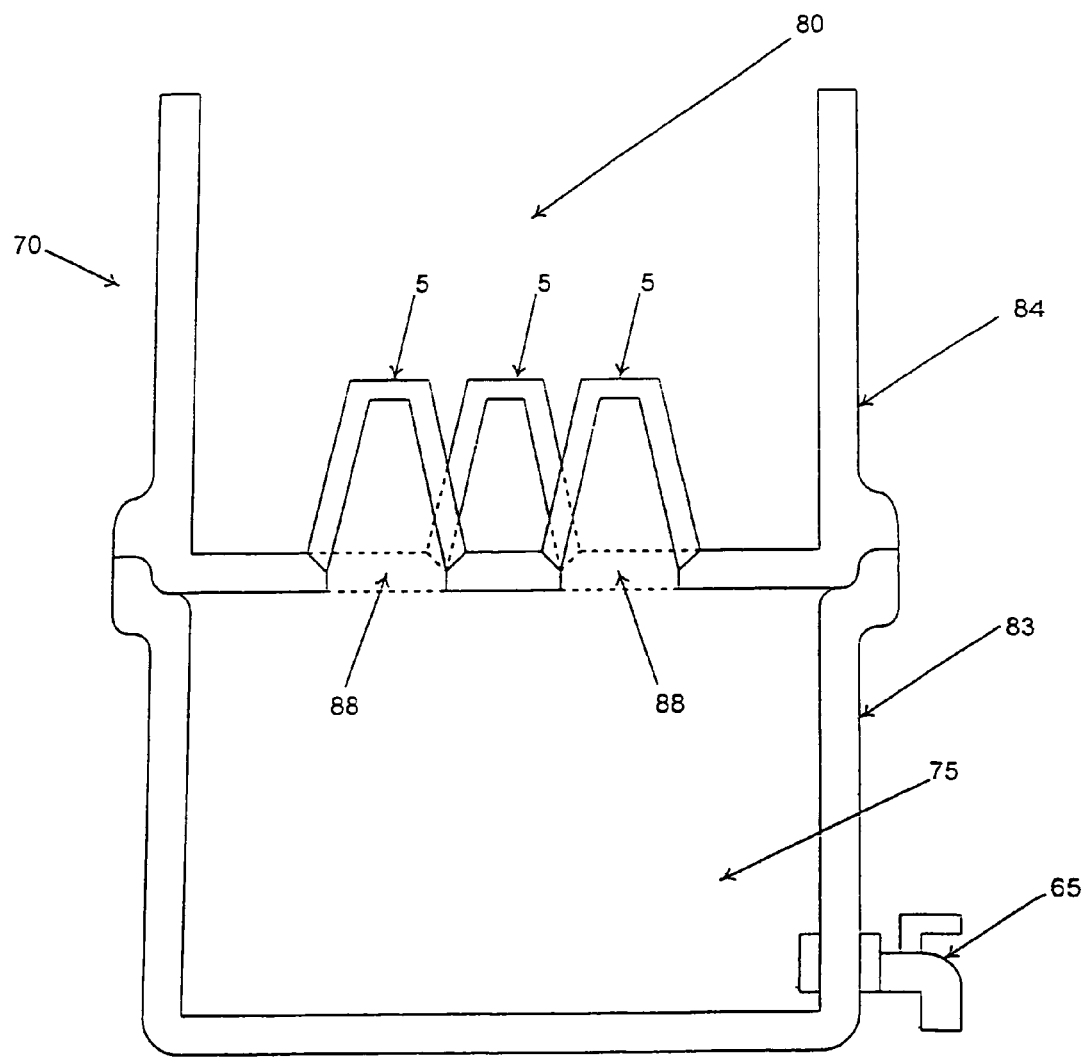
FIG. 8 is a cross-sectional side view of a further exemplary liquid purification system incorporating the liquid purification filter of FIG. 1 and FIG. 2.

FIG. 8 illustrates a cross-sectional side view of several water purification filters 5, illustrated in FIG. 1 and FIG. 2, utilized in a further preferred embodiment of the water purifier system 70. The water purifier system 70 illustrated in FIG. 8 is essentially the same as that shown in FIG. 6 and described above with the exception of the utilization of several filters 5. Where the water flow rate through a single filter 5 is not sufficient to meet the needs of a user or users, the use of multiple filters 5 has an advantage of increasing the water flow rate through the water purifier system 70. While the water purifier system 70 illustrated in FIG. 8 is shown with three filters 5, the invention is not so limited and may utilize as few as one filter 5 up to as many filters 5 as will fit in the bottom of the upper container 84.

Figure 9:
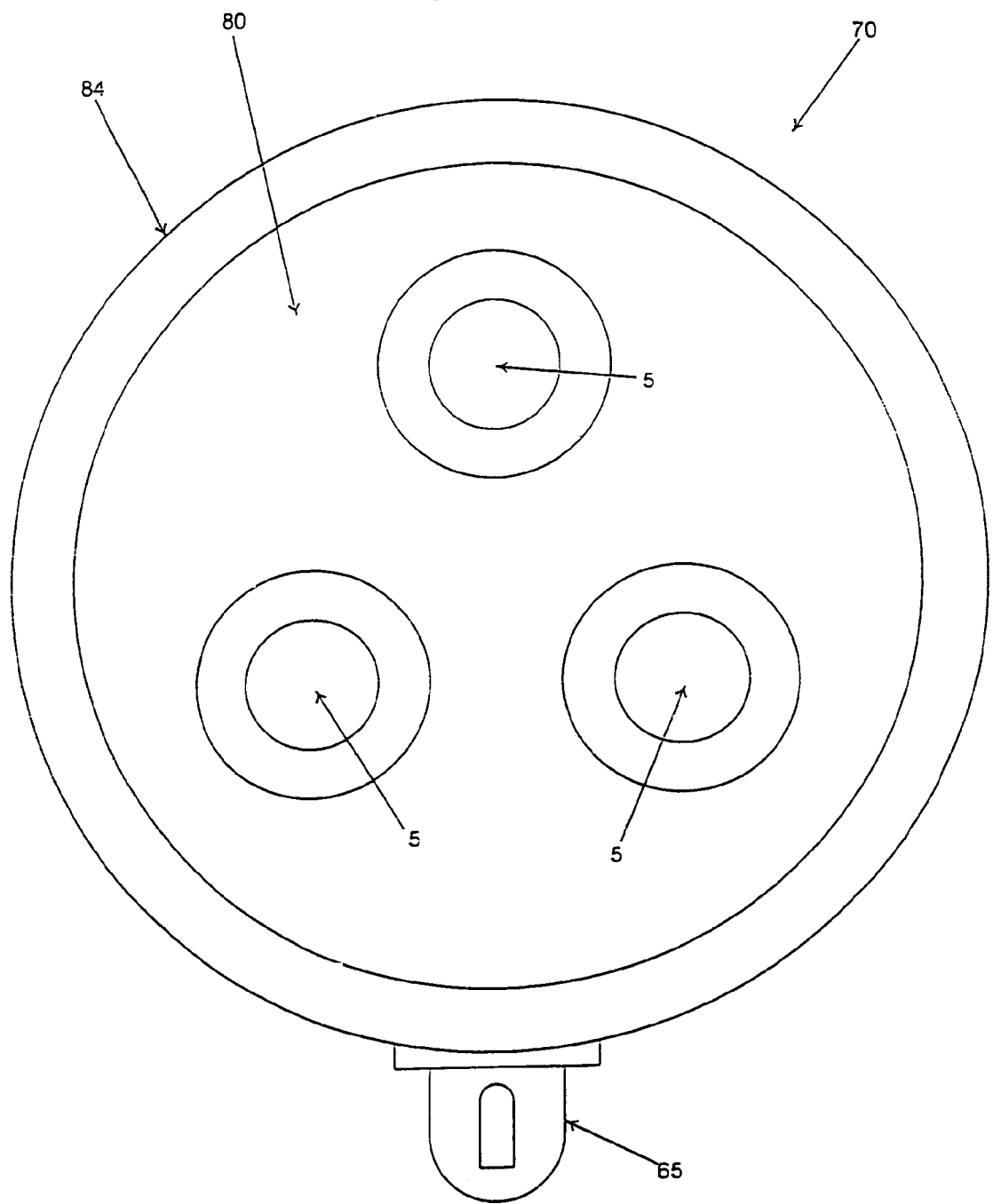
FIG. 9 is a perspective top view of the liquid purification system of FIG. 8.

FIG. 9 illustrates a top perspective view of the water purifier system 70 of FIG. 8. As shown in FIG. 9, the filters 5 are positioned in the bottom of the upper container 84.

Figure 10:
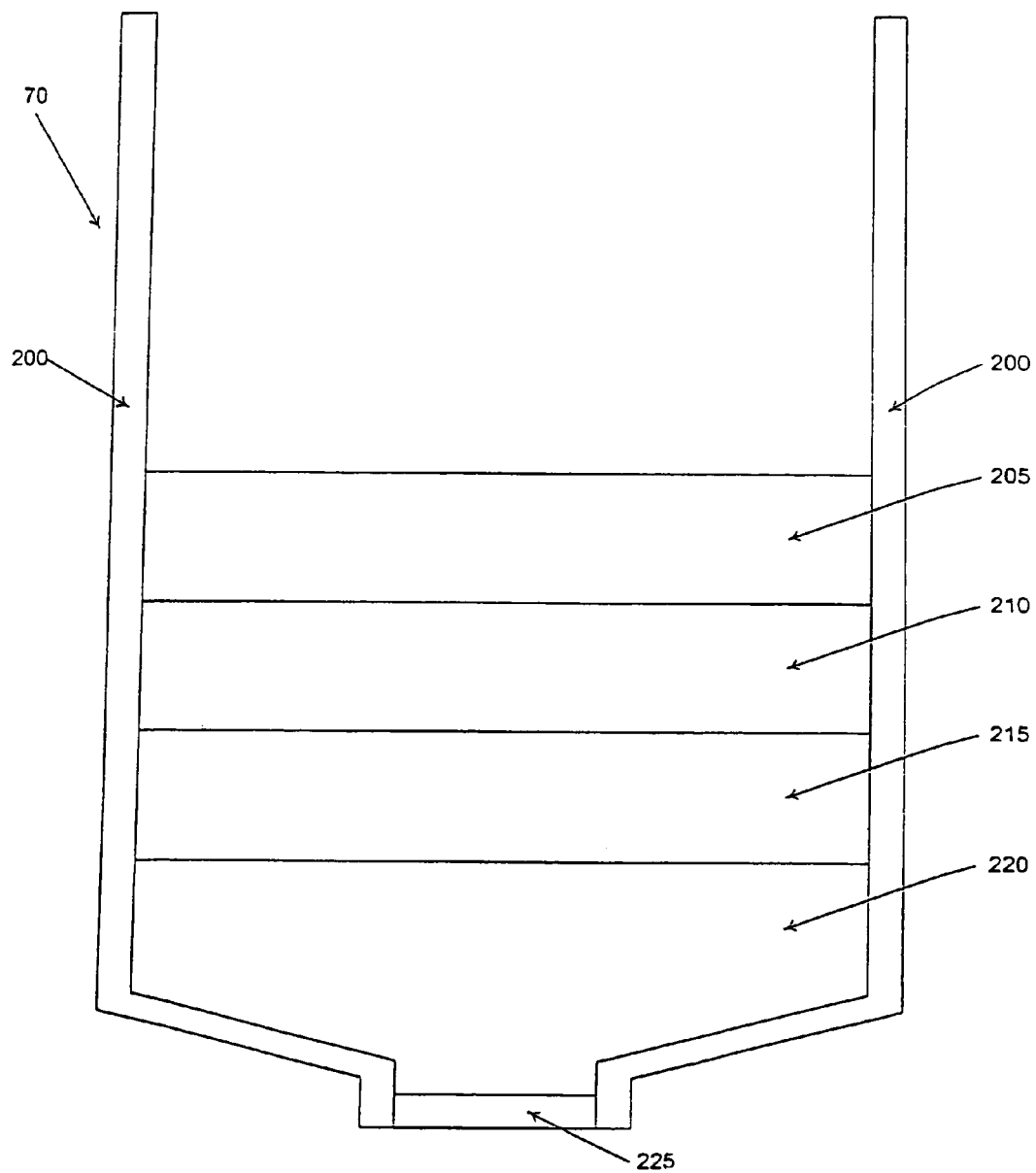
FIG. 10 is a cross-sectional side view of a further exemplary liquid purification system incorporating the porous grog of the present invention.

FIG. 10 illustrates a cross-sectional side view of the porous grog of the present invention utilized in a further exemplary water purifier system 70. As illustrated in FIG. 10, a top layer 205, a first intermediate layer 210, a second intermediate layer 215 and a bottom layer 220 are bounded by a container 200 and a retention cap 225. Optionally, the container 200 may be covered with a cap or lid to prevent the interior of the container 200 from becoming contaminated by foreign particles. Preferably, the container 200 comprises a non-toxic, relatively water impermeable material. In a preferred embodiment, this material is earthenware or plastic.

In a preferred embodiment, the top layer 205 comprises particles of sizes from about 4.0 mm to about 6.0 mm. In a more preferred embodiment, the top layer 205 comprises particles of sizes of about 5.0 mm. Preferably, the particles of the top layer 205 comprise stone, porous grog, or a mixture thereof.

In a preferred embodiment, the first intermediate layer 210 comprises particles of sizes from about 0.5 mm to about 1.5 mm. In a more preferred embodiment, the first intermediate layer 210 comprises particles of sizes of about 1.0 mm. Preferably, the particles of the first intermediate layer 210 comprise sand, porous grog, or a mixture thereof. In a preferred embodiment, the second intermediate layer 215 comprises particles of sizes of about 60 mesh to about 100 mesh. In a more preferred embodiment, the second intermediate layer 215 comprises particles of sizes of about 80 mesh. The particles of the second intermediate layer 215 comprise sand, porous grog, or a mixture thereof. In a preferred embodiment of the present invention, the bottom layer 220 comprises particles of sizes of about 100 mesh to about 140 mesh. In a more preferred embodiment of the present invention, the bottom layer 220 comprises particles of sizes of about 120 mesh. The particles of the bottom layer 220 comprise sand, porous grog, or a mixture thereof.

While the top layer 205, first intermediate layer 210, second intermediate layer 215 and bottom layer 220, as illustrated in FIG. 10, are shown as each having an equal depth, the invention is not so limited. The top layer 205, first intermediate layer 210, second intermediate layer 215 and bottom layer 220 may each independently be of equal or differing depth.

The retention cap 225, as illustrated in FIG. 10, prevents the top layer 205, first intermediate layer 210, second intermediate layer 215 and bottom layer 220 from exiting the container 200 while still allowing liquid to exit from the interior of the container 200. In a preferred embodiment of the present invention, the retention cap 225 comprises a mesh, plastic sieve screen. In a more preferred embodiment, the mesh, plastic sieve screen is from about 100 mesh to about 150 mesh. In another preferred embodiment of the present invention, the retention cap 225 is dry pressed earthenware with a pre-fired body composition comprising clay, porous grog and combustible material. In a preferred embodiment, the body composition contains between about 30% and about 60% by weight of clay, between about 30% and about 60% by weight of porous grog, and between about 5% and about 20% by weight of combustible material. In a more preferred embodiment, the composition contains about 45% by weight of clay, about 45% by weight of porous grog and about 10% by weight of combustible material. In a preferred embodiment, silver is applied to the dry pressed earthenware following firing.

According to the embodiment of the present invention illustrated in FIG. 10, nonpurified water is poured into the top of the container 200. The nonpurified water passes through the top layer 205, the first intermediate layer 210, the second intermediate layer 215, and the bottom layer 220. The water then permeates through the retention cap 225 and exits the water purifier system 70 as purified water.

Figure 11:
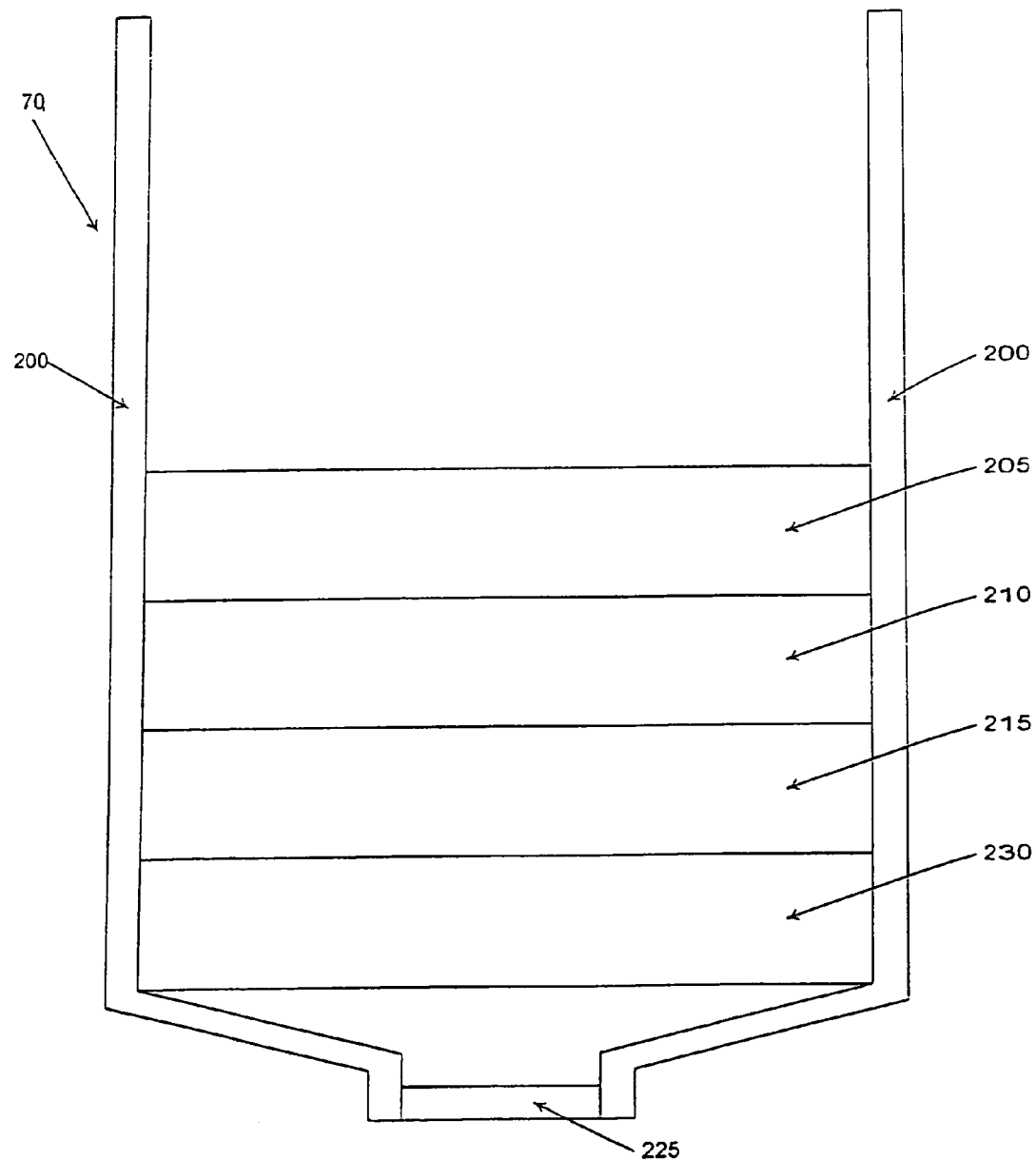
FIG. 11 is a cross-sectional side view of a further exemplary liquid purification system incorporating the porous grog of the present invention.

FIG. 11 illustrates a cross-sectional side view of the porous grog of the present invention utilized in a further exemplary water purifier system 70. As illustrated in FIG. 11, a top layer 205, a first intermediate layer 210, a second intermediate layer 215, and a purifier disk 230 are bounded by a container 200 and a retention cap 225. Optionally, the container 200 may be covered with a cap or lid to prevent the interior of the container 200 from becoming contaminated by foreign particles. Preferably, the container 200 comprises a non-toxic, relatively water impermeable material. In a preferred embodiment, the material is earthenware or plastic.

In a preferred embodiment, the top layer 205 comprises particles of sizes from about 4.0 mm to about 6.0 mm. In a more preferred embodiment, the top layer 205 comprises particles of sizes of about 5.0 mm. Preferably, the particles of the top layer 205 comprise stone, porous grog, or a mixture thereof.

In a preferred embodiment, the first intermediate layer 210 comprises particles of sizes from about 0.5 mm to about 1.5 mm. In a more preferred embodiment, the first intermediate layer 210 comprises particles of sizes of about 1.0 mm. Preferably, the particles of the first intermediate layer 210 comprise sand, porous grog, or a mixture thereof. In a preferred embodiment, the second intermediate layer 215 comprises particles of sizes of about 60 mesh to about 100 mesh. In a more preferred embodiment, the second intermediate layer 215 comprises particles of sizes of about 80 mesh. The particles of the second intermediate layer 215 comprise sand, porous grog, or a mixture thereof.

As illustrated in FIG. 11, a purifier disk 230 is located adjacent to the second intermediate layer 215. The purifier disk 230 comprises dry pressed earthenware with a pre-fired body composition comprising clay, porous grog and combustible material. In a preferred embodiment, the body composition contains between about 30% and about 60% by weight of clay, between about 30% and about 60% by weight of porous grog, and between about 5% and about 20% by weight of combustible material. In a more preferred embodiment, the composition contains about 45% by weight of clay, about 45% by weight of porous grog and about 10% by weight of combustible material. In a preferred embodiment, silver is applied to the purifier disk following firing.

According to the embodiment of the present invention illustrated in FIG. 11, nonpurified water is poured into the top of the container 200. The nonpurified water passes through the top layer 205, the first intermediate layer 210, the second intermediate layer 215, and permeates through the purifier disk 230. The water then permeates through the retention cap 225 and exits the water purifier system 70 as purified water.

Figure 12:
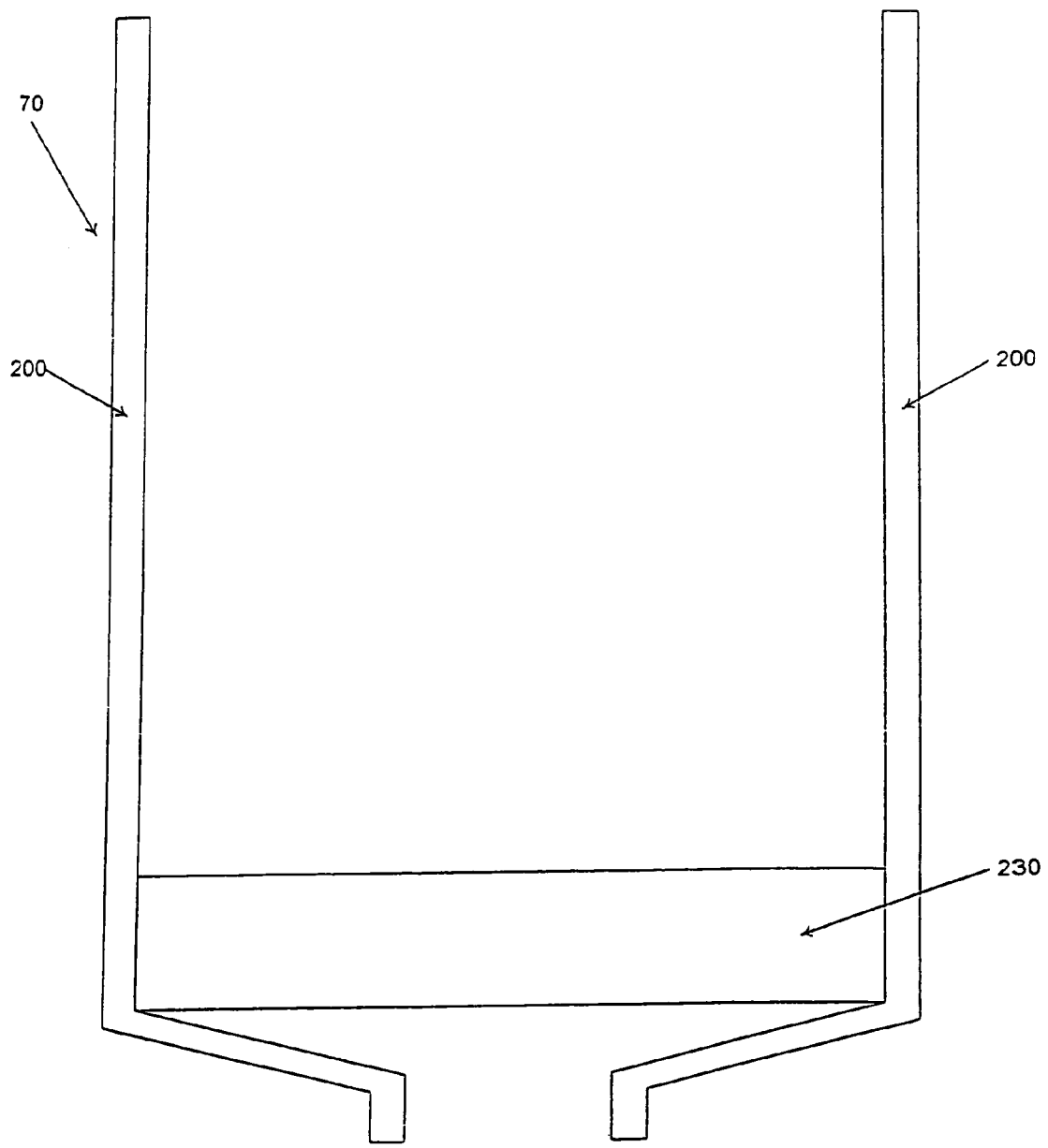
FIG. 12 is a cross-sectional side view of a further exemplary liquid purification system incorporating the porous grog of the present invention.

FIG. 12 illustrates a cross-sectional side view of the porous grog of the present invention utilized in a further exemplary water purifier system 70. As illustrated in FIG. 12, a purifier disk 230 is bounded by a container 200. Optionally, the container 200 may be covered with a cap or lid to prevent the interior of the container 200 from becoming contaminated by foreign particles. Preferably, the container 200 comprises a non-toxic, relatively water impermeable material. In a preferred embodiment, the material is earthenware or plastic.

As illustrated in FIG. 12, a purifier disk 230 is bounded by the container 200. The purifier disk 230 comprises dry pressed earthenware with a pre-fired body composition comprising clay, porous grog and combustible material. In a preferred embodiment, the body composition contains between about 30% and about 60% by weight of clay, between about 30% and about 60% by weight of porous grog, and between about 5% and about 20% by weight of combustible material. In a more preferred embodiment, the composition contains about 45% by weight of clay, about 45% by weight of porous grog and about 10% by weight of combustible material. In a preferred embodiment, silver is applied to the purifier disk following firing.

According to the embodiment of the present invention illustrated in FIG. 12, nonpurified water is poured into the top of the container 200. The nonpurified water permeates through the purifier disk 230 and exits the bottom of the container 200 as purified water.

For the permeable grog purifiers of the present invention, looking under a microscope it is clear that the filter medium is not homogenous with respect to permeability. The micrograph in FIG. 13 shows the fired purifier medium at 5× magnification. This micrograph shows many elongated pores 100, those primarily involved in bringing about control over the amount of flow. It should be noted that the larger white areas 101 indicate pores caused by burnout of a number of combined grains of flour. The larger dark areas 102 indicate some of the bigger particles of the 10 mesh grog. The micrograph indicates that the permeability varies from clump to clump, or particle to particle within the purifier.

FIG. 14 shows the micrograph of the un-fired purifier medium at 20× magnification. The dark areas 200 indicate the pre-fired grog and the grayish area 201 indicates the un-fired clay. The white areas 202 show pores where the composition was not fully compacted during mixing of the grog and the clay compositions. From these micrographs, it is evident that the most permeable material is the porous grog and the least permeable is the plastic clay necessary in facilitating forming the resultant porous grog purifier of the present invention.

Figure 15:
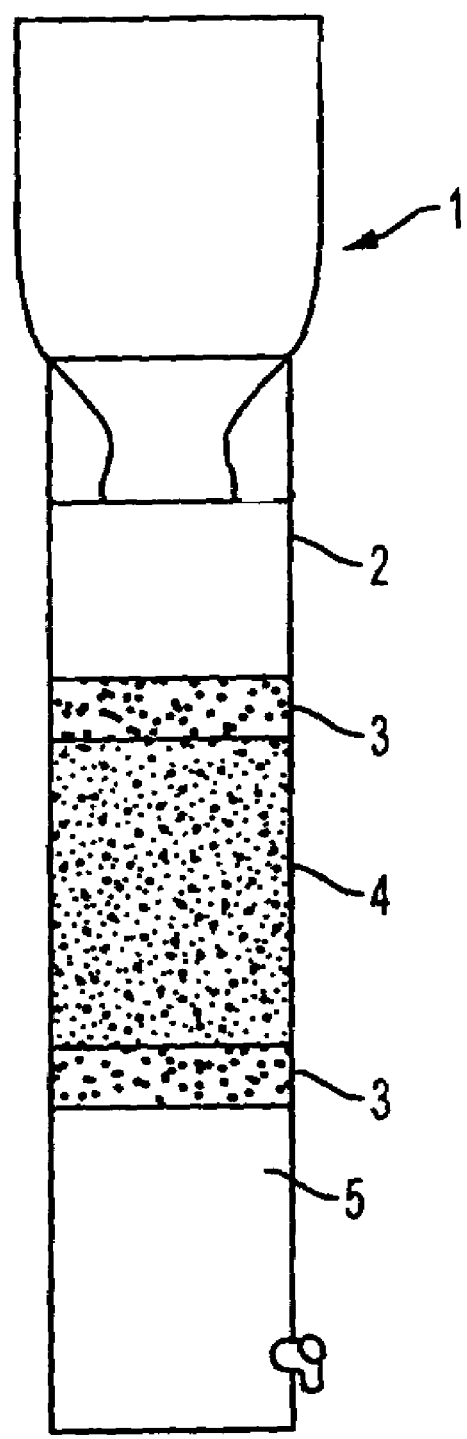
FIG. 15 is a sketch of a silver chloride treated porous grog purifier with a central porous grog purifying bed layer with two backflush layers.

FIG. 15 illustrates another embodiment of the invention wherein the water purifying device has a purifying bed layer comprising crushed porous grog particles with two backflush layers that also comprises crushed porous grog particles. Nonpurified water is poured into the top of the container such as from a water bottle 1 where the nonpurified water 2 passes through the top backflush layer 3 comprising crushed porous grog having particle sizes of 20 to 30 mesh, the intermediate purifying bed layer 4 comprising porous grog having particle sizes of 30 to 100 mesh and the bottom backflush layer 3 having particle sizes of 20 to 30 mesh. The porous grog particles are further treated with silver chloride for disinfection. The purified water then permeates through the retention cap and exits a water purifier system as purified water 5.

Figure 16:
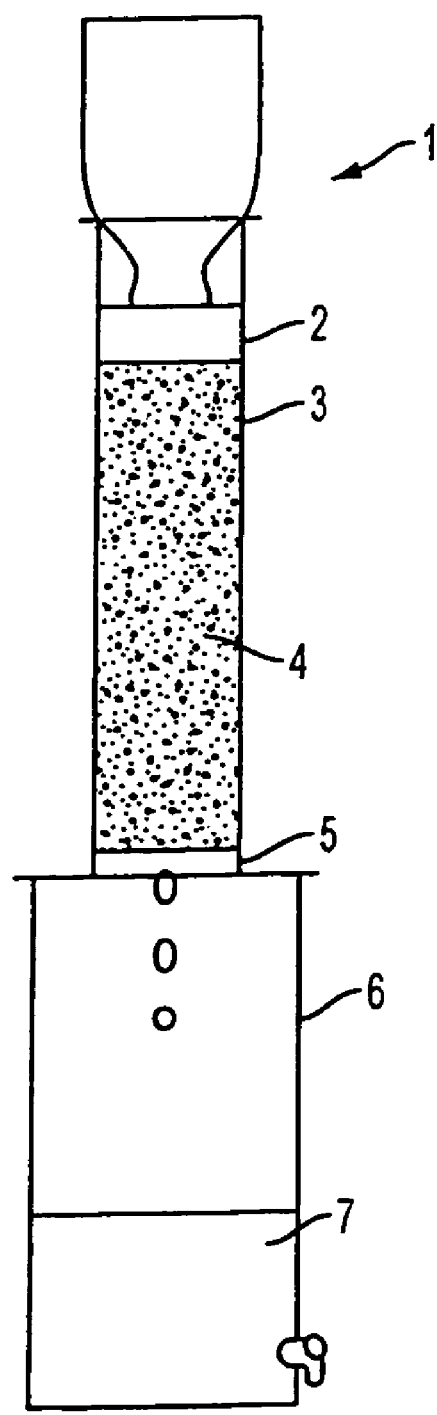
FIG. 16 is a sketch of the silver chloride treated elementary red-brick particulate water purification device of the present invention.

Referring to FIG. 16 an elementary version of the water purifier is shown. Unpurified water is poured through the top of a container using an inverted plastic bottle 1. The container 3 may be made from plastic, clay or metallic material. Preferably the container comprises clay material. The unpurified water 2 permeates through the silver chloride treated red brick particulate grog purifying bed layer 4 comprising particle sizes of 100 mesh and finer with and percolates through the retention cap 5 to the bottom container 6 as purified bacteria-free drinking water 7.

Figure 17:
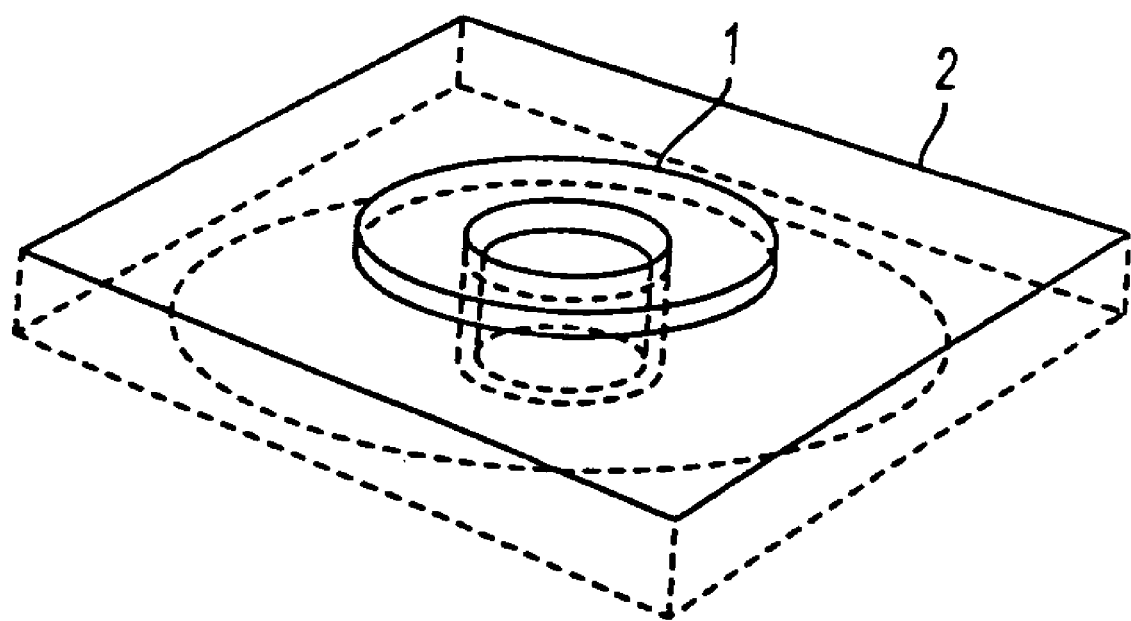
FIG. 17 is a sketch of the pottery toilet liner that is inset into a toilet aperture of a concrete slab.

FIG. 17 illustrates a pit latrine. The drawing indicates a silver chloride treated pottery toilet liner 1 that is inset into the aperture of a concrete slab 2, using a concrete mortar.

Figure 18A:
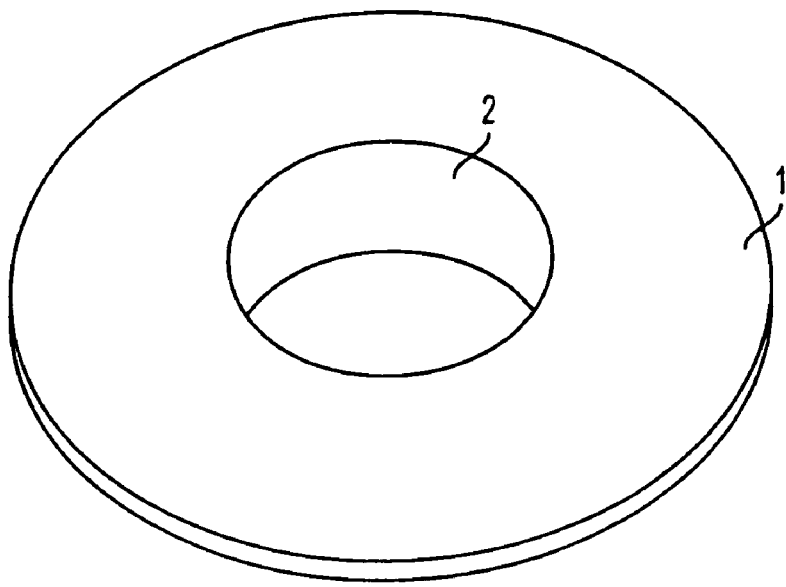
FIG. 18(*a*) is a picture of the top view and (*b*) is a picture of the bottom view of the silver chloride treated pottery toilet liner.
Figure 18B:
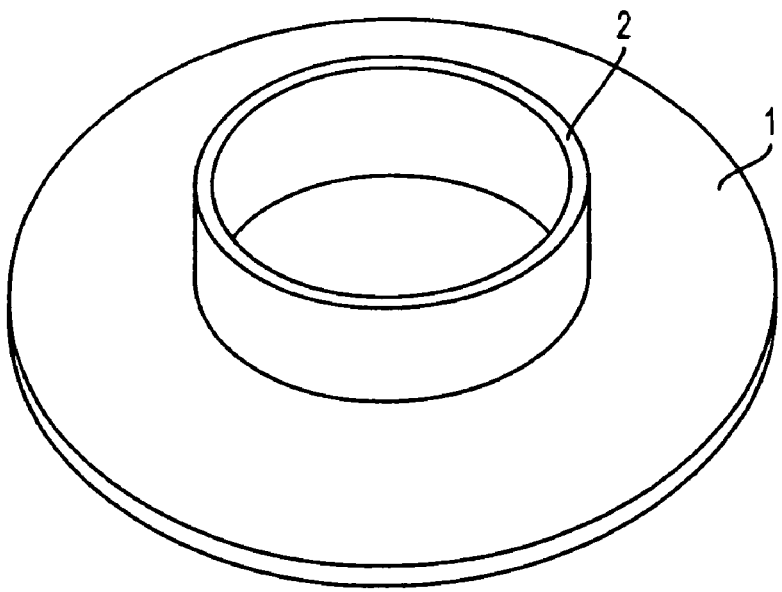

FIGS. 18(*a*) and (*b*) illustrates the top and bottom view of the pottery toilet liner respectively. This liner is a one piece device wherein the first circular flat piece of earthenware 1 is attached to a cylindrical second piece of earthenware 2 resulting in a cross sectional T shape with an aperture in the middle of the first piece 1.

Although the present invention has been described in terms of particularly preferred embodiments, it is not limited to these embodiments. Alternative embodiments and modifications, which would still be encompassed by the invention, may be made by those skilled in the art, particularly in light of the foregoing teachings. Therefore, the following claims are intended to cover any alternative embodiments, modifications or equivalents which may be within the spirit and scope of the invention as defined by the claims.

The invention claimed is:

1. A device for purifying contaminated water, said device comprising:
  a top layer comprising porous grog, crushed brick or a mixture thereof having particle sizes from about 10 to 20 mesh;
  a first intermediate layer comprising porous grog, crushed brick or a mixture thereof having particle sizes from about 60 mesh to about 100 mesh;
  a second intermediate layer comprising porous grog, crushed brick particles or a mixture thereof having particle sizes from about 60 mesh to about 100 mesh with a further, single digit percentage addition of sub 100 mesh grog for adjusting flow rate downward; and
  wherein said layers comprises silver chloride; wherein said contaminated water passing in order through said top layer, said first intermediate layer and said second intermediate layer.

2. A device for purifying contaminated water, said device comprising:
  top and bottom backflush layers comprising porous grog or crushed brick particles or mixture thereof having particle sizes of 10 to 20 mesh; a central purifying bed layer comprising porous grog having particle sizes 30 to 100 mesh; with a further, single digit percentage addition of sub 100 mesh grog for adjusting flow rate downward; wherein said backflush layers and intermediate layer further comprises silver chloride; and wherein said contaminated water passing in order through said top backflush layer, said intermediate layer and said bottom backflush layer.

3. A device for purifying water, said device comprising:
  a container and silver chloride treated red-brick particulate grog, said silver chloride treated red-brick particulate grog is prepared by crushing red-brick to about 30 grog, saturating the crushed red-brick with silver nitrate salt, drying the silver nitrate saturated crushed red-brick, and saturating the dried silver nitrate saturated crushed red-brick with salt water.

\* \* \* \* \*